(12) United States Patent
Kanada

(10) Patent No.: US 7,634,073 B2
(45) Date of Patent: Dec. 15, 2009

(54) VOICE COMMUNICATION SYSTEM

(75) Inventor: Yasusi Kanada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1059 days.

(21) Appl. No.: 10/914,647

(22) Filed: Aug. 10, 2004

(65) Prior Publication Data

US 2005/0265535 A1 Dec. 1, 2005

(30) Foreign Application Priority Data

May 26, 2004 (JP) .............................. 2004-155733

(51) Int. Cl.
*H04M 3/42* (2006.01)
*G06F 15/16* (2006.01)
(52) U.S. Cl. ................. 379/202.01; 709/204
(58) Field of Classification Search ............ 379/202.01; 348/14.08; 370/260–261; 709/204, 205; 455/456; 715/757
See application file for complete search history.

(56) References Cited

U.S. PATENT DOCUMENTS

| 5,889,843 | A | 3/1999 | Singer et al. | |
|---|---|---|---|---|
| 6,219,045 | B1 * | 4/2001 | Leahy et al. | ................. 715/757 |
| 6,262,711 | B1 | 7/2001 | Cohen et al. | |
| 7,346,654 | B1 * | 3/2008 | Weiss | .......................... 709/204 |
| 2002/0007396 | A1 * | 1/2002 | Takakura et al. | ............. 709/205 |
| 2002/0115450 | A1 * | 8/2002 | Muramatsu | .................. 455/456 |
| 2003/0067536 | A1 * | 4/2003 | Boulanger et al. | ........ 348/14.08 |

FOREIGN PATENT DOCUMENTS

JP 2002-236031 8/2002

OTHER PUBLICATIONS

Colin Lowe and Laurent Babarit., "Distributed 3D audio rendering." HP Labs., http://www7.scu.edu.au/programme/fullpapers/1912 Jul. 25, 2003 pp. 1-9.
A. Singer et al., "Tangible Progress: Less Is More In Somewire Audio Spaces." Papers CHI May 15-20, 1999. pp. 104-111 & 625.
Hideyuki Nakanishi, et al. "FreeWalk: A 3D Virtual Space for Casual Meetings", Apr.-Jun. 1999 IEEE.

(Continued)

*Primary Examiner*—Ahmad F Matar
*Assistant Examiner*—Sonia Gay
(74) *Attorney, Agent, or Firm*—McDermott Will & Emery LLP

(57) ABSTRACT

A voice communication system, in which the real space is associated with a virtual space and a relative location and direction of a communication partner in the real space can be grasped as bodily sensations, is provided. A client 201 comprises a GPS receiver 231 and a magnetic sensor 232 which detects a location of a user of the client 201 itself in the real space, a presence provider 222 which sends the location detected by the detection means to a server apparatus, a space modeler 332 which calculates a location of the user in the virtual space based on the location of the user himself and locations of the other users in the real space, and an audio renderer 216 which controls sound effects based on the locations of the users in the virtual space.

14 Claims, 16 Drawing Sheets

OTHER PUBLICATIONS

Hideyuki Nakanishi, et al. "FreeWalk: Supporting Informal Communication in a Three Dimentional Virtual Space", IPSJ Journal, vol. 39, No. 5, pp. 1356-1364, May 1998.
http://www.opengl.org.
http://www.atc.creative.cdm/algorithms/eax20.pdf.
Schulzrinne, et al. "RTP: A Transport Protocol for Real-Time Applications." Standards Track, RFC 3550 Jul. 2003. pp. 1-52.

U.S. Appl. No. 10/697,553, filed Oct. 31, 2003, Kanada.
RFC 3261 SIP: Session Initiation Protocol, © The Internet Society (2002).
RFC 3265 SIP—Specific Event Notificaiton, © The Internet Society (2002).
Perkins, *RTP: Audio and Video for the Internet*, Chapter 6 Media Capture, Playout, and Timing, Addison-Wesley Pub Co.

\* cited by examiner

FIG.6 PROCESSING IN AUDIO RENDERER

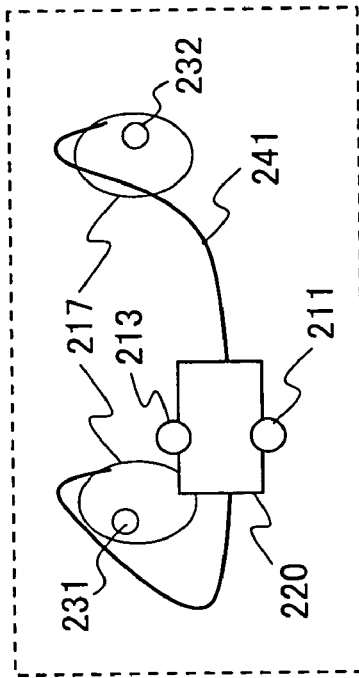
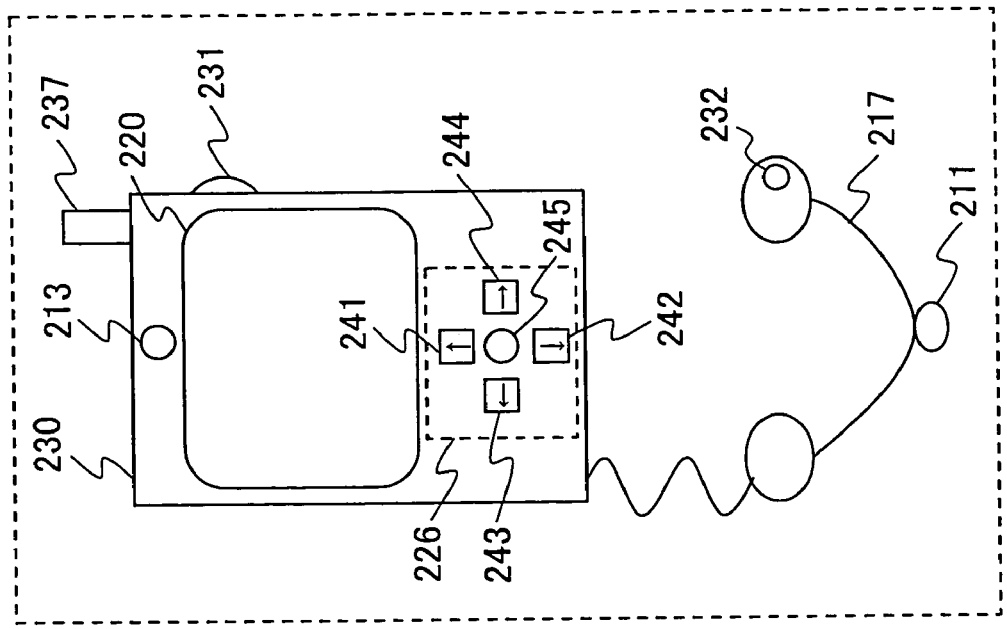

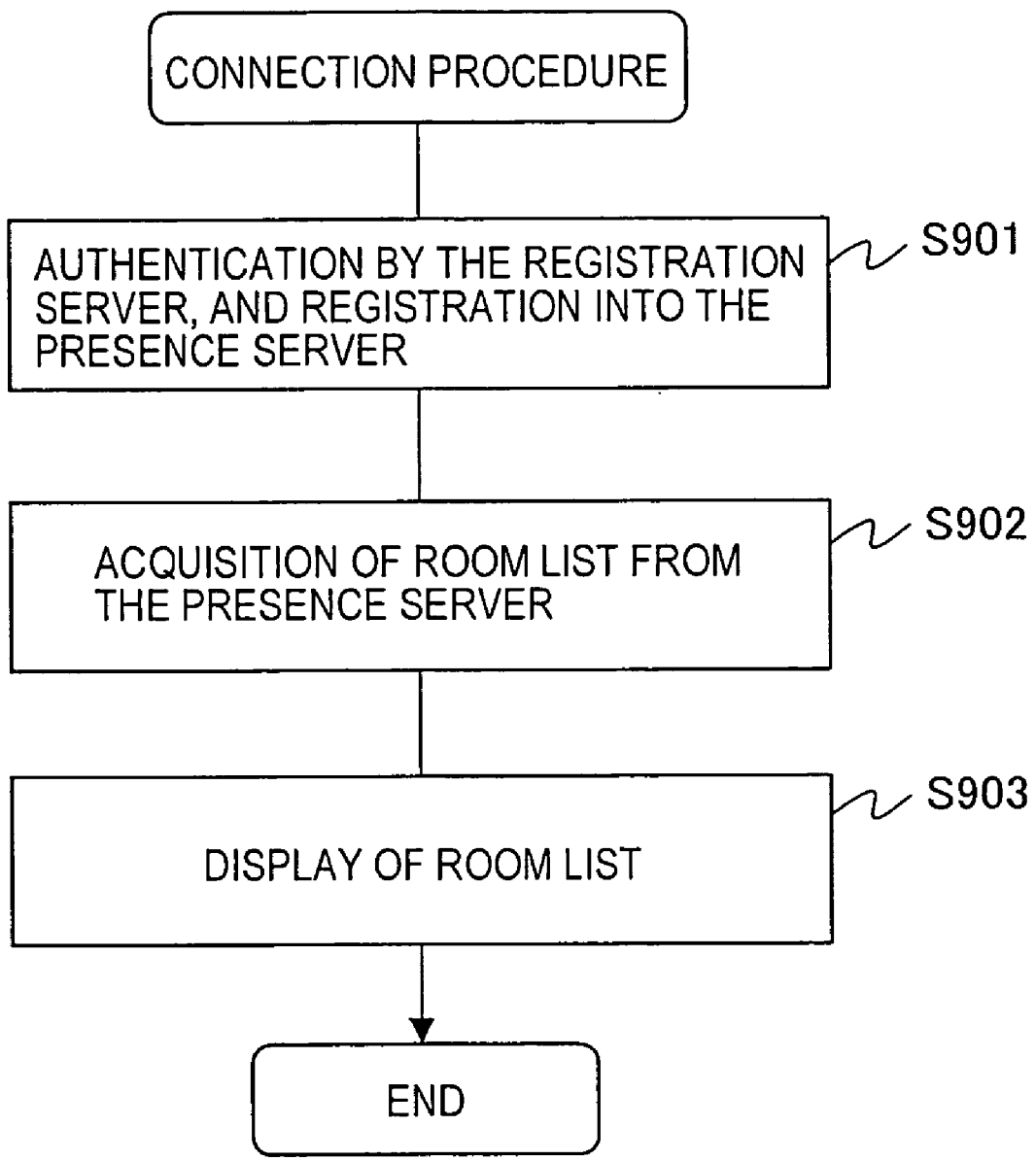

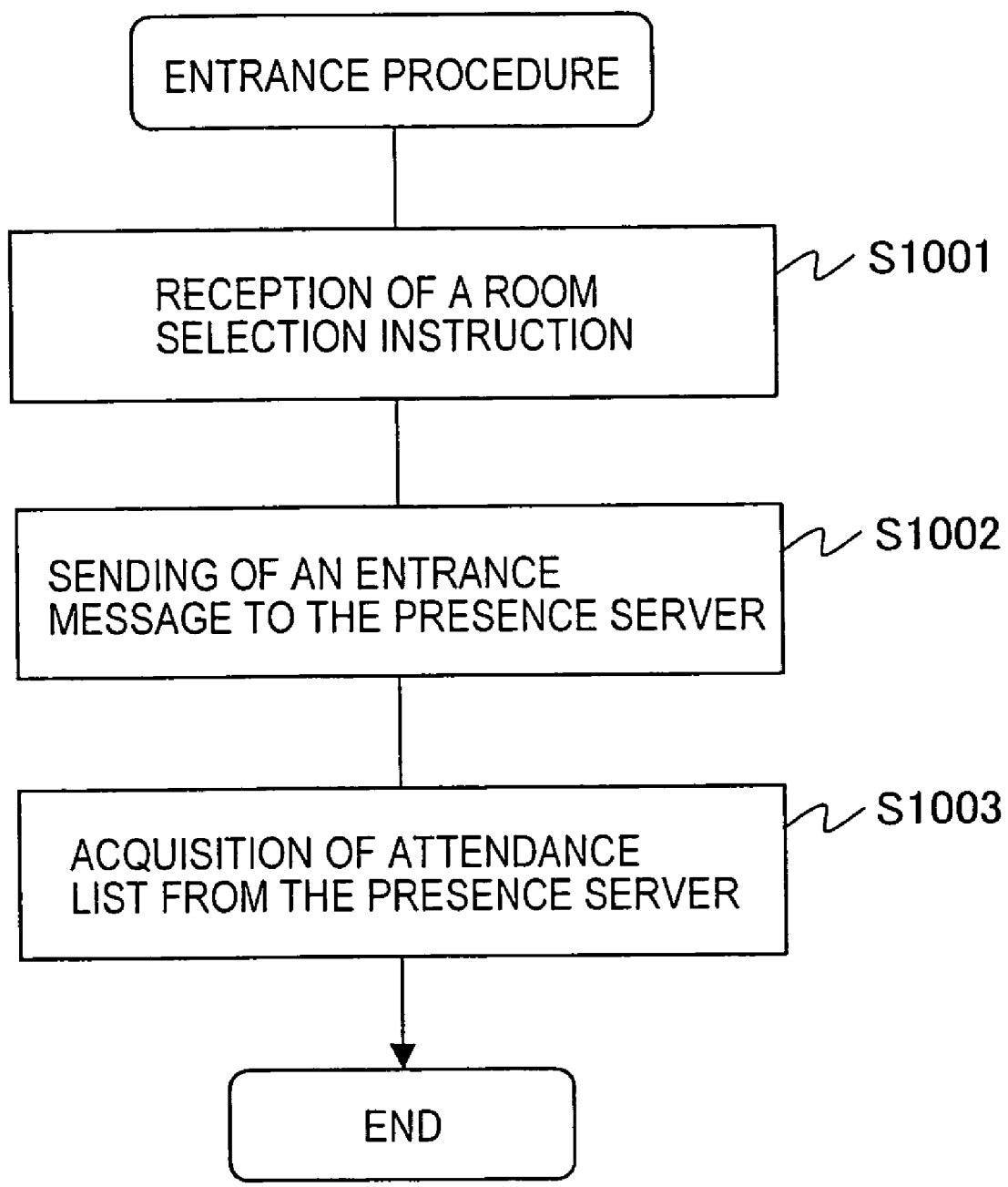

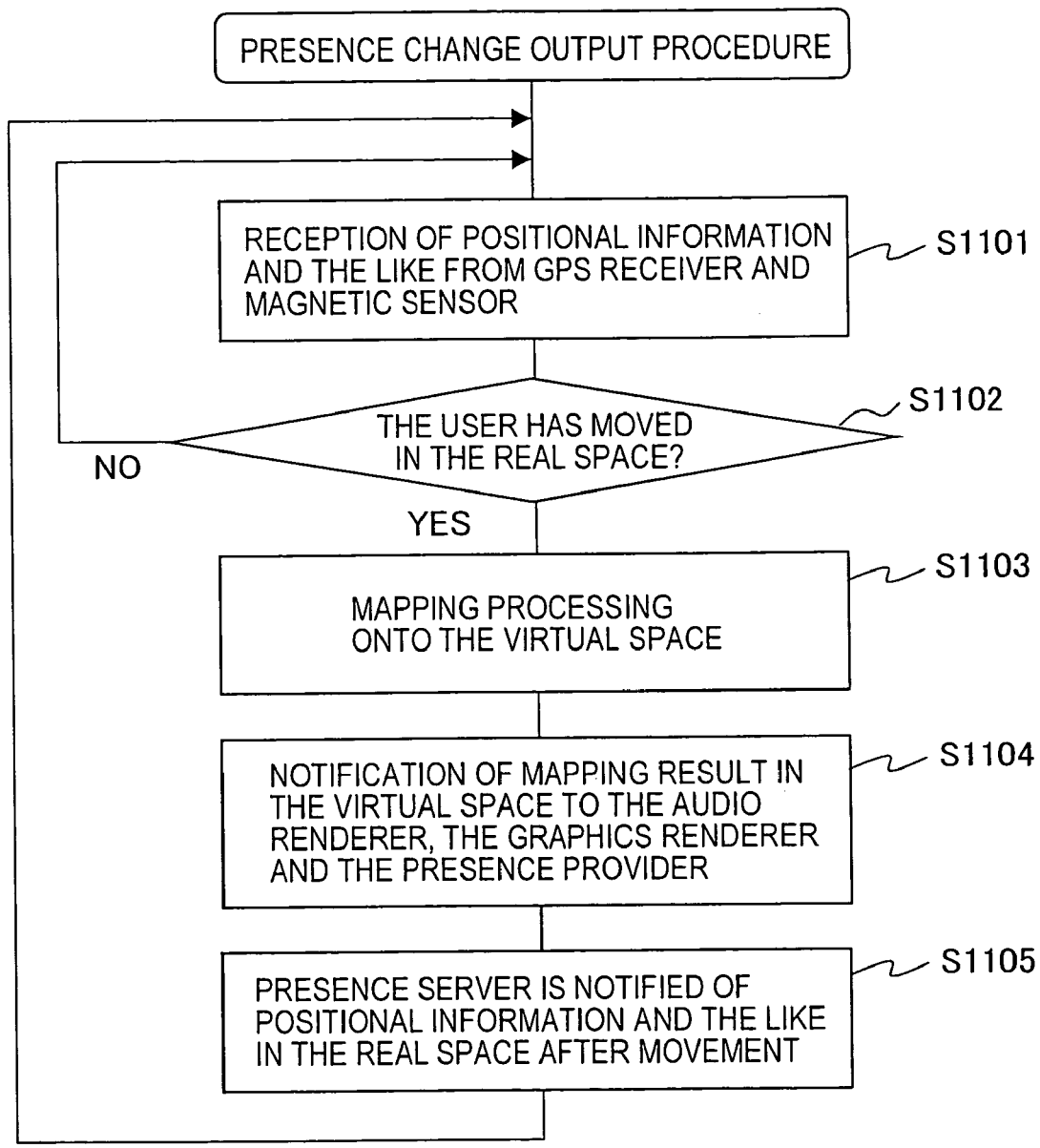

VOICE COMMUNICATION SYSTEM

CLAIM OF PRIORITY

The present application claims priority from Japanese Patent Application JP 2004-155733 filed on May 26, 2004, the content of which is hereby incorporated by reference into this application.

BACKGROUND OF THE INVENTION

The present invention relates to a technique by which people talk with one another mainly in voice through a medium.

Japanese Patent Laid-Open Publication No. 2002-236031 (hereinafter, referred to as Patent Document 1) discloses a navigation system in which the GPS technique is used to display relative positional information of a user of a portable telephone and his communication partner based on positional information of that user and positional information of the communication partner.

As a conference system using a virtual space, there is FreeWalk, which is a conference system developed by Kyoto University. See, for example, NAKANISHI, Hideyuki, YOSHIDA, Chikara, NISHIMURA, Toshikazu and ISHIDA, Toru, "FreeWalk: Support of Non-formal Communication Using Three-dimensional Virtual Space", IPSJ Journal, Vol. 39, No. 5, pp. 1356-1364, 1998 (hereinafter, referred to as Non-patent Document 1) and Nakanishi, H., Yoshida, C., Nishimura, T. and Ishida, T., "FreeWalk: A 3D Virtual Space for Casual Meetings", IEEE Multimedia, April-June 1999, pp. 2028 (hereinafter, referred to as Non-patent Document 2).

FreeWalk is a system in which users of the conference system share a virtual space by three-dimensional graphics, as an image seen from his viewpoint or from a viewpoint that is near to his viewpoint but able to see himself within the range of vision. Three-dimensional graphics is a technique for simulating a three-dimensional space by computer graphics, and, for example, OpenGL (http://www.opengl.org/), which is de facto standard, and Direct 3D of Microsoft Corporation are APIs (Application Programming Interfaces) for achieving that end. An image of a conversational partner is shot by a video camera and projected in real time on a virtual screen located in the image seen from, for example, the user's viewpoint. Further, each user can move free in this virtual space. Namely, each user can change his location in this virtual space, using a pointing device or keys of a keyboard. In Non-patent documents 1 and 2, voice is damped as distance increases, but those documents do not mention the below-mentioned three-dimensional audio technique.

Moreover, there is Somewire, which is a conference system developed by Interval Research Corporation. See, for example, U.S. Pat. No. 5,889,843 (hereinafter, referred to as Patent Document 2), U.S. Pat. No. 6,262,711 B1 (hereinafter, referred to as Patent Document 3), and Singer, A., Hindus, D., Stifelman, L., and White, S., "Tangible Progress: Less Is More In Somewire Audio Spaces", ACM CHI '99 (Conference on Human Factors in Computing Systems), pp. 104 to 112, May 1999 (hereinafter, referred to as Non-patent Document 3). Somewire is a system in which users of the conference system share a virtual system and users in the same space can talk with one another. In Somewire, voice is reproduced by high quality stereo audio. Further, Somewire has an intuitive tangible interface, since it employs GUI (Graphical User INterface) that can control a location of a conversational partner in the virtual space by moving a doll-like figure. In Somewire, voice is not damped as distance increases, and the three-dimensional audio technique is not employed.

Furthermore, there is a conference system using the distributed 3D audio technique developed by Hewlett-Packard Company. See, for example, Low, C. and Babarit, L., "Distributed 3D Audio Rendering", 7th International World Wide Web Conference (WWW7), 1998, http://www7.scu.edu.au/programme/fullpapers/1912/com1912.htm (hereinafter, referred to as Non-patent Document 4). The distributed 3D audio technique is a technique that applies a three-dimensional audio technique to a networked system (so-called distributed environment). The three-dimensional audio technique is a technique of simulating a three-dimensional acoustic sp ace, and, for example, Open AL (http://www.opengl.org/) prescribed by Loki Entertainment Software Inc. and others and DirectSound 3D of Microsoft Corporation, EAX2.0 (http://www.atc.dreative.com/algorithms/eax20.pdf) of Creative technology, Ltd. are mentioned as APIs for achieving that end. Using the three-dimensional audio technique, it is possible to simulate a direction and distance of a sound source seen from a listener, in sound reproduction using speakers such as headphones or 2- or 4-channel speakers, and to locate the sound source in an acoustic space. Further, by simulating acoustic properties such as reverberation, reflection by an object such as a wall, sound absorption by air depending on distance, sound interception by an obstacle, and the like, it is possible to express an impression of existence of a room and an impression of existence of an object in a space. The three-dimensional audio technique is one of stereo phone reproduction systems. In addition to the three-dimensional audio technique, the stereo phone reproduction systems include simple stereo phone reproduction techniques. For example, may be mentioned a stereo phone reproduction technique that differentiates sound volumes between left and right speakers in headphones to reproduce a plurality of sounds separately.

SUMMARY OF THE INVENTION

Sometimes, even if a communication partner on a portable telephone is in a location near to a person (i.e., a location that can be seen from the person), it is difficult for that person to find the communication partner. For example, in a congested amusement park or a downtown station, even if a person is talking with a communication partner through a portable telephone within seeing distance, it is difficult to find the communication partner in a crowd and to approach him. Further, in a construction site or the like, sometimes it is necessary to grasp a working position (station) of an unseen cooperating worker.

Further, in the case where a communication partner in a virtual space (i.e., a communication partner with whom a person is communicating through a medium) exists near in the real space, sometimes communication partner's media sound generated by the three-dimensional audio technique and direct sound in the real space are heard in different directions or at different distances. As a result, there occurs an unfavorable situation that a person turns his face in a different direction when he responds to a hail from a communication partner existing near to him in the real sp ace.

Patent Document 1 displays a location of a communication partner on a map, but does not consider making a partner's location recognized through voice. Further, in the convention systems described in Patent Documents 2 and 3 and Non-patent documents 1-4, a communication partner's location in the real space is not considered.

The present invention has been made taking the above situation into consideration. An object of the present invention is to provide a voice communication system in which the real space is associated with a virtual space, and a relative location and direction of a communication partner in the real space can be grasped as bodily sensations.

To solve the above problems, the present invention calculates locations of a plurality of users in a virtual space, based on positional information of each user in the real space.

For example, the present invention provides a voice communication system for realizing conversation between a plurality of users through a virtual space.

The voice communication system comprises a server apparatus which manages respective locations of the users in a real space, and a plurality of client terminals used respectively by the users.

Each of the client terminals comprises: a location detection means which detects positional information relating to a location of a user of the client terminal itself in the real space; a client sending means which sends the positional information of the user of the client terminal itself in the real space to the server apparatus, with the positional information being detected by the location detection means; a client receiving means which receives positional information relating to a location of each of the other users than the user of the client terminal itself in the real space from the server apparatus; a space modeling means which calculates respective locations of the users in the virtual space, based on the positional information of the user of the client terminal itself and the positional information of each of the other users; and a sound control means which controls sound effects applied to a voice of each of the other users, based on the locations calculated by the space modeling means.

The server apparatus comprises: a server receiving means which receives the positional information of a user of a client terminal in the real space from the client terminal, for each of the plurality of client terminals; a storing means which stores the positional information of each of the users in the real space, with the positional information being received by the server receiving means; and a server sending means which sends the positional information of other users than a user of a client terminal to said client terminal, for each client terminal of the client terminals, with the positional information being stored in the storing means.

BRIEF DESCRIPTION OF THE DRAWINGS

FIG. 8A shows an example of a client in the embodiment;

FIG. 8B shows an example of a client in the embodiment;

FIG. 9 is a flowchart showing network connection processing of a client in the embodiment;

FIG. 10 is a flowchart showing entrance processing of a client in the embodiment;

FIG. 11 is a flowchart showing processing of its own user's movement by a client in the embodiment;

DETAILED DESCRIPTION OF THE PREFERRED EMBODIMENTS

Now, embodiments of the present invention will be described.

Figure 1:
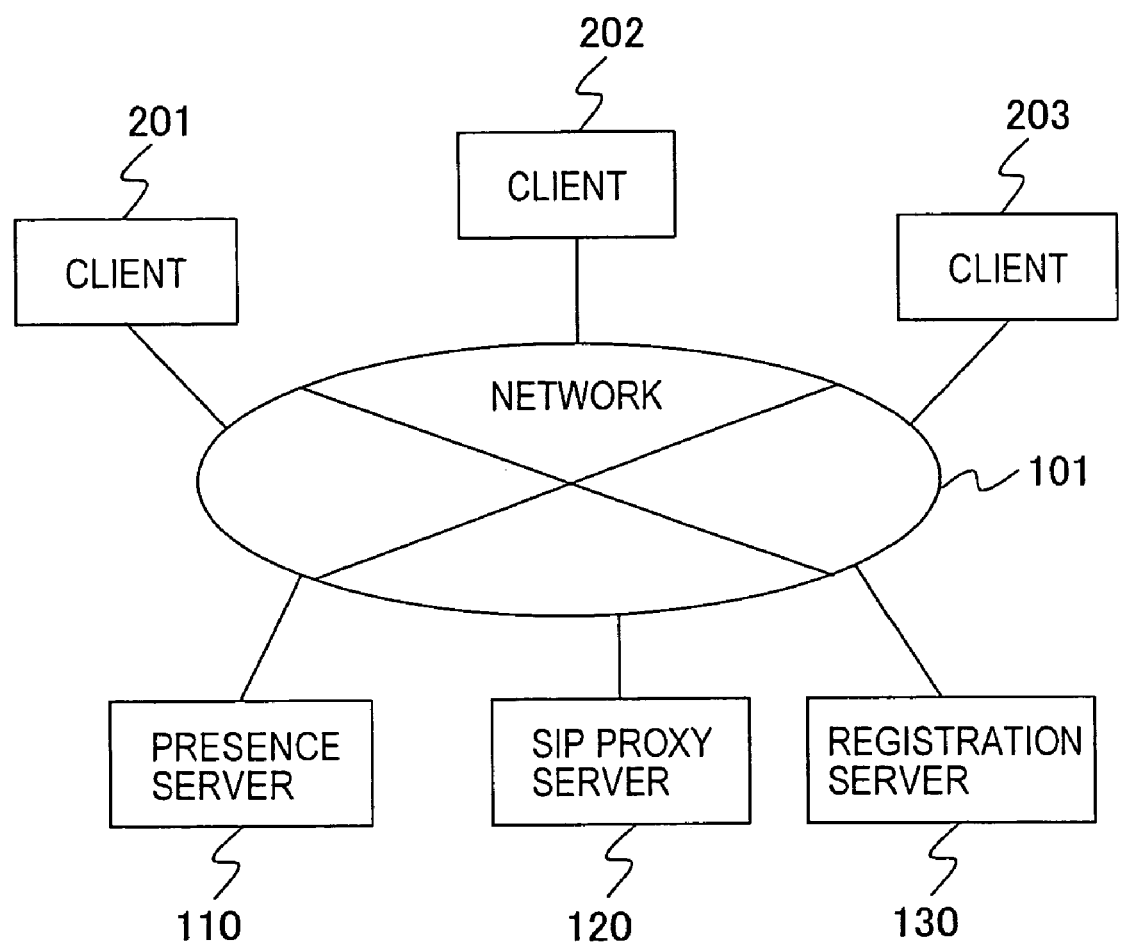
FIG. 1 is a diagram showing a network configuration of an embodiment of the present invention.

FIG. 1 shows a system configuration of a voice communication system to which an embodiment of the present invention is applied. As shown in the figure, this system comprises a plurality of clients 201, 202 and 203, a presence server 110 which manages presence, an SIP proxy server 120 which controls sessions, and a registration server 130 which registers and authenticates users, being connected with one another through a network 101 such as the Internet. Here, presence means a virtual space itself and positional information (impression of existence) of each user in the virtual space.

Although three clients exist in the present embodiment, the number of clients is not limited to three and may be two, four, or more. Further, in the present embodiment, the network 101 consists of a single domain. However, it is possible that a network consists of a plurality of domains, and the domains are connected with one another to enable communication extending over a plurality of domains. In that case, there exist a plurality of presence servers 110, a plurality of SIP proxy servers 120, and a plurality of registration servers 130.

Next, will be described a hardware configuration of the voice communication system.

Figure 2:
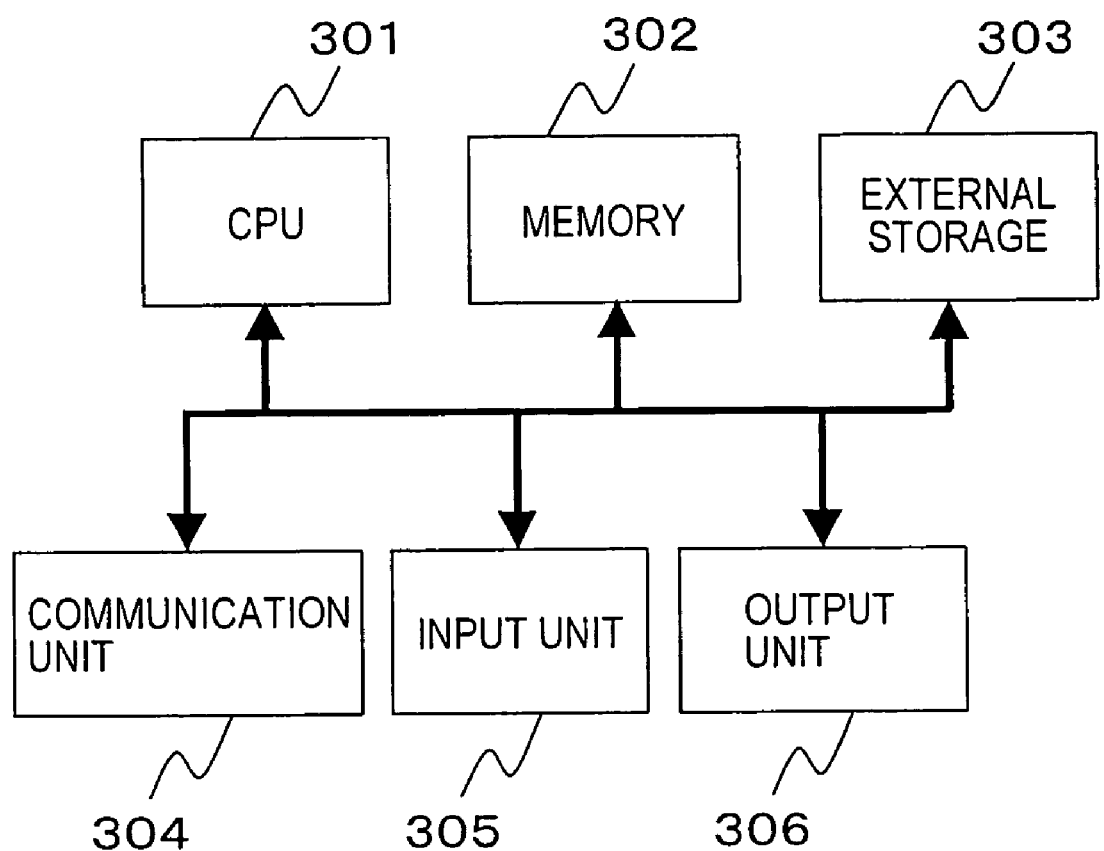
FIG. 2 is a block diagram showing a hardware configuration of each apparatus in the embodiment.

FIG. 2 shows a hardware configuration of each of the clients 201, 202 and 203, the presence server 110, the SIP proxy server 120 and the registration server 130.

Each of the clients 201, 202 and 203 can be implemented by an ordinary computer system comprising a CPU 301 which executes data processing and calculation according to programs, a memory 302 from which the CPU 301 can directly read and write, an external storage 303 such as a hard disk, a communication unit 304 for data communication with an external system, an input unit 305, and an output unit 306. For example, a portable computer system such as PDA (Personal Digital Assistant), a wearable computer, or PC (Personal Computer) may be mentioned. The input unit 305 and the output unit 306 will be described in detail later, referring to FIG. 3.

Each of the presence server 110, the SIP proxy server 120 and the registration server 130 can be implemented as an ordinary computer system at least comprising a CPU 301 which executes data processing and calculation according to programs, a memory 302 from which the CPU 301 can directly read and write, an external storage 303 such as a hard disk, and a communication unit 304 for data communication with an external system. For example, a server or a host computer may be mentioned.

The below-mentioned functions of the above-mentioned apparatuses will be each realized when the CPU 301 executes a certain program (in the case of the client 201, 202 or 203, a program for a client; in the case of the presence server 110, a program for the presence server; in the case of the SIP proxy server 120, a program for the proxy server; and in the case of the registration server 130, a program for the registration server) loaded onto or stored in the memory 302.

Figure 3:
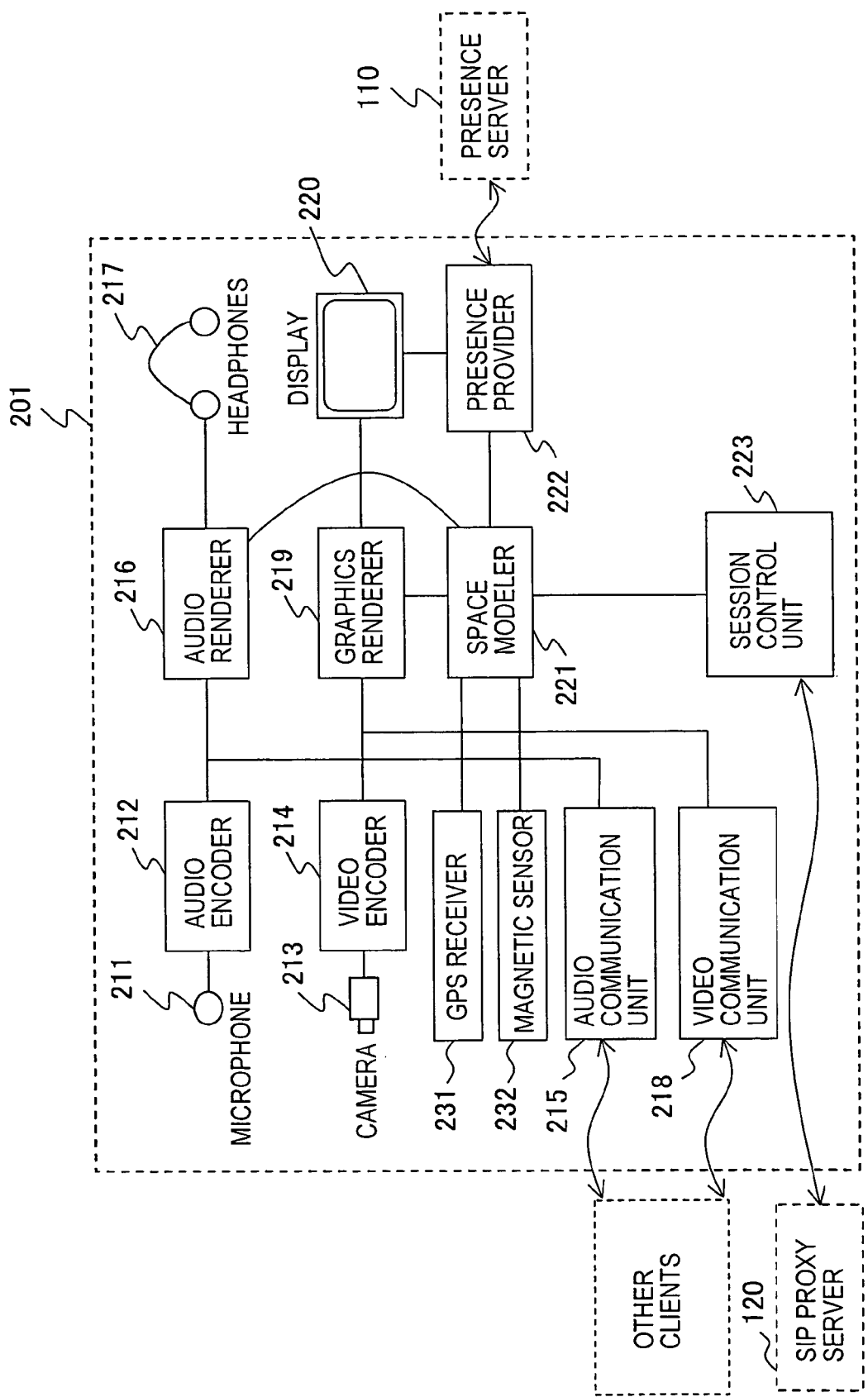
FIG. 3 is a block diagram showing a configuration of a client in the embodiment.

Next, referring to FIG. 3, will be described the input unit 305 and the output unit 306 of the client 201 and functional components of the client 201. The clients 202 and 203 have similar configurations to the client 201.

As the input unit 305, the client 201 has a microphone 211, a camera 213, a GPS receiver 231, a magnetic sensor 232, and an operation unit (not shown). As the output unit 306, the client 201 has headphones 217 adapted for the three-dimensional audio technique and a display 220. The GPS receiver 231 receives GPS signals from at least three GPS satellites. And for those (at least three) GPS satellites, the GPS receiver 231 measures a distance between the client 201 and each GPS satellite and a rate of change of the distance, to calculate a current location of a user who carries the client 201 in the real space. The magnetic sensor 232 detects the magnetic field of the earth, and, based on the detection result, calculates a direction (a compass direction) of the user carrying the client 201 in the real space. Instead of the magnetic sensor 232, may be used a gyrocompass which detects an angle of rotation of a movable body.

As the functional components, the client 201 comprises: an audio encoder 212, an audio renderer 216, a video encoder 214, a graphics renderer 219, a space modeler 221, a presence provider 222, an audio communication unit 215, a video communication unit 218 and a session control unit 223.

The audio encoder 212 converts voice into a digital signal. The audio renderer 216 performs processing (such as reverberation and filtering) resulting from properties of a virtual space, using the three-dimensional audio technique. The video encoder 214 converts an image into a digital signal. The graphics renderer 219 performs processing resulting from the properties of the virtual space. The space modeler 221 receives positional information and directional information in the real space from the GPS receiver 231 and the magnetic sensor 232, to calculate presence such as user's location and direction in the virtual space. The presence provider 222 sends and receives user's positional information and directional information in the real space to and from the presence server 110. The audio communication unit 215 sends and receives an audio signal in real time to and from another client. The video communication unit 218 sends and receives a video signal in real time to and from another client. The session control unit 223 controls a communication session between the client 201 and another client or the presence server 110, through the SIP proxy server 120.

Here, the virtual space is a virtually-created space for conference or conversation between a plurality of users, and is managed by the presence server 110. When a user enters a certain virtual space, the presence server 110 sends information on the properties of the virtual space, and positional information and directional information in the real space with respect to the other users existing in the virtual space. Then, the space modeler 221 stores the sent information and the positional information and the directional information of the user of the client 201 itself in the real space into the memory 302 or the external storage 303. Here, the positional information and the directional information are inputted from the GPS receiver 231 and the magnetic sensor 232 respectively. The properties of the virtual space include the size of the space, the height of the ceiling, the reflectance ratios/colors/textures of the walls and the ceiling, the reverberation properties, and the sound absorption rate owing to air in the space, for example. Among them, the reflectance ratios of the walls and the ceiling, the reverberation properties and the sound absorption rate owing to air in the space are auditory properties, the colors and textures of the walls and the ceiling are visual properties, and the size of the space and the height of the ceiling are both auditory and visual properties.

Next, operation of each function will be described in the order of presence, voice and image.

As for presence, the GPS receiver 231 and the magnetic sensor 232 calculate the location and direction of the user of the client 201 itself in the real space, and input the positional information and the directional information of the user in question to the space modeler 221. The space modeler 221 holds properties of the virtual space (such as the size of the space and reverberation properties) and the positional information and the directional information of the other users (existing in the virtual space) in the real space, in the memory 302 or the external storage 303. Those properties and the positional information and the directional information are sent in advance from the presence server 110. Based on the properties of the virtual space and the positional information of the user of the client 201 itself and the other users, the space modeler 221 maps the real space to the virtual space. In the case where the virtual space includes the user of the client 201 itself and a plurality of other users, a user who is nearer to the user of the client 201 itself in the real space is arranged by the space modeler 221 at a location nearer to the user of the client 201 in the virtual space also. The mapping from the real space to the virtual space may be a linear mapping, in which positional information in the real space is scaled down into locations in the virtual space, or a non-linear mapping. A non-linear mapping will be described in the following.

Figure 4:
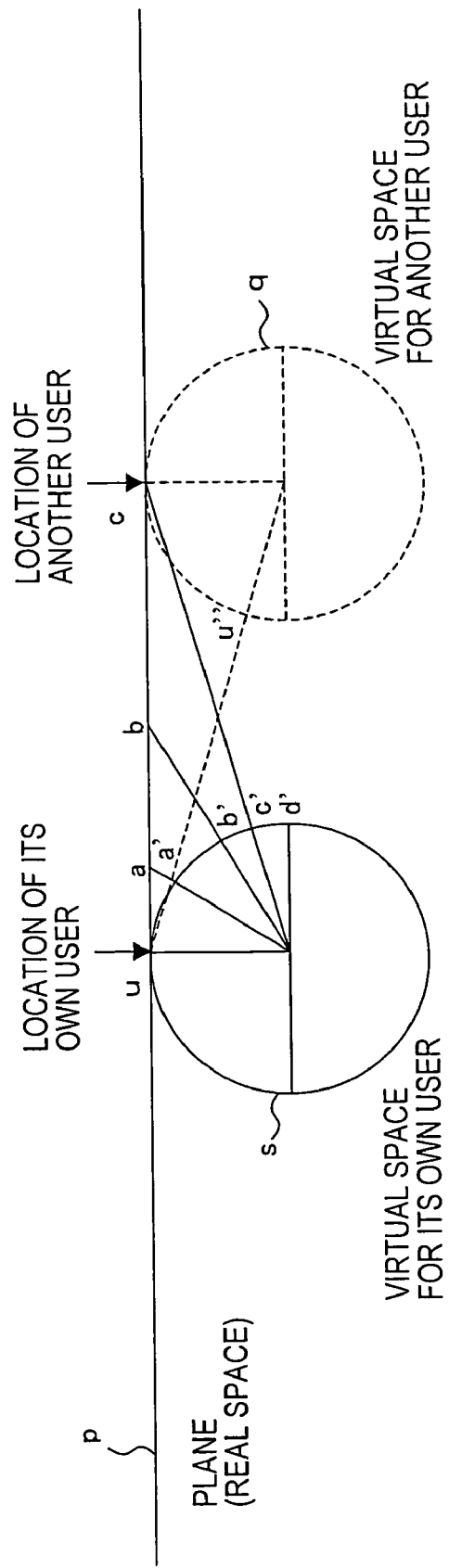
FIG. 4 is a diagram schematically showing mapping between the real space and a virtual space in the embodiment.

FIG. 4 is a diagram schematically showing an example of a non-linear mapping between the real space and the virtual space, and this non-linear mapping uses arctan(x). As a common coordinate system, the non-linear mapping shown in the figure uses coordinates (positional information) in the real space. FIG. 4 illustrates a plane p that indicates the real space and is perpendicular to the page surface, a location u of the user of the client 201 itself in the real space, and a location c of a third other user in the real space. In other words, a cutting plane line including u and c of the plane p is shown in the page (FIG. 4). Further, FIG. 4 illustrates a cross section of a sphere s that is tangent to the plane p and indicates the virtual space of the user of the client 201 itself, and a cross section of a sphere q that is tangent to the plane p and indicates a virtual space of the third other user. Further, it is assumed that a first other user exists at a location a in the plane p of the real space and a second other user at a location b.

In that case, the space modeler 221 converts a distance d from another user into arctan(d/r) (r: a constant), i.e., the length (multiplied by a constant) of an arc on the sphere s. In detail, the first other user existing at the location a (its distance from the user of the client 201 itself is a length of a line segment extending from u to a) in the real space is mapped into (located at) a location a' (its distance from the user of the client 201 itself is a length of an arc ranging from u to a') in the virtual space. Similarly, the space modeler 221 maps (locates) the second other user existing at the location b in the real space into a location b' in the virtual space, and the third other user existing at the location c in the real space into a location c' in the virtual space. Namely, for each point in the plane p, the space modeler 221 performs coordinate transformation from the plane p as the real space onto the sphere s as the virtual space. In the above description, it is assumed, for the sake of illustration on the page (figure), that all the users other than the user of the client 201 itself exist on the above-mentioned cutting plane line. However, even in the case where two or more users other than the user of the client 201 do not exist on a same line including the user of the client 201, similar mapping is possible in a three-dimensional space.

Further, in the case where a user other than the user of the client 201 exists at infinity, the user in question is mapped to (located at) the location d' in the virtual space. Thus, by mapping infinity into a point of a finite distance, it is possible to talk with another user existing in the same virtual space even if that user is at the longest distance. Further, the space modeler 221 performs mapping into each location a', b', c', d' in a state that the upper half of the sphere s as the virtual space is stretched flat.

Further, as a property of the virtual space, the space modeler 221 holds a radius r (or the radius r multiplied by a constant) of the sphere s as the virtual space, in the memory 302 or the external storage 303. Using the radius r of the sphere s, which is held in the memory or the like 302, 303, the space modeler 221 sets the sphere s as the virtual space. The property of the virtual space, i.e., the radius r of the sphere s is managed by the presence server 110 and notified to the space modeler 221 of each client. In other words, for all the users existing in the same virtual space, the radius r of the sphere s as the virtual space coincides. As a result, it is possible to make users' senses of distance coincide.

Further the sphere q is the virtual space of the third other user existing at the location c in the real space. Similarly to the space modeler 221 of the user of the client 201, the space modeler 221 of the third other user uses arctan(x) to map (locate) the user of the client 201 existing at the location u in the real space into a location u'' in the real space.

Then, using the directional information of each user who has mapped into the virtual space, the space modeler 221 sets a direction of each user. In the case where the direction of the magnetic sensor 232 does not coincide with the direction of the user (when, for example, a mounting position of the magnetic sensor 232 is not fixed), or in the case where the magnetic sensor 232 does not indicate a correct direction owing to magnetic disturbance, it is possible to perform the following operation. For example, in order to make the magnetic sensor 232 indicate a correct direction, the user turns in a specific direction (for example, in the north) and pushes a reset button on the operation unit 226 (See FIG. 8A). The space modeler 221 receives a signal from the reset button and corrects output from the magnetic sensor such that the direction at that point of time is taken for the above-mentioned specific direction. Further, instead of the above-described correction based on an absolute direction (a specific direction), it is possible to consider a method in which another user's direction in the real space is made coincident with his direction in the virtual space. For example, the user turns his face to another user existing in the neighborhood and pushes the reset button, to correct output of the magnetic sensor 232 such that the direction in the real space is made coincident with the relative direction in the virtual space. In the case where a plurality of correction methods are prepared in the client, the user first selects a method and then pushes the reset button.

The space modeler 221 sends the positional information and the directional information of the user of the client 201 itself in the real space to the presence server 110 through the presence provider 222. Further, the space modeler 221 receives the positional information and the directional information of the other users in the real space from the presence server 110. Namely, the space modeler 221 receives the positional information and the directional information of the other users through the network 101, and accordingly it is inevitable delays and jitters occur with respect to the locations and the directions of the other users in the virtual space. On the other hand, a delay and jitters scarcely occur in the location and the direction of the user of the client 201 itself since the GPS receiver 231 and the magnetic sensor 232 directly input information to the space modeler 221.

As for voice, the microphone 211 collects voice of the user of the client 201 and sends the collected voice to the audio encoder 212. The audio encoder 212 converts the received voice into a digital signal and outputs the digital signal to the audio renderer 216. Further, the audio communication unit 215 sends and receives an audio signal or signals in real time to and from one or more other clients, and outputs the received audio signal or signals to the audio renderer 216.

Into the audio renderer 216, digital output signals outputted from the audio encoder 212 and the audio communication unit 215, are inputted. Then, using the three-dimensional audio technique, the audio render 216 calculates how voices of other users (communication partners) are heard in the virtual space, based on the auditory properties of the virtual space and the locations (mapped into the virtual space) of the user of the client 201 itself and the other users. In the following, referring to FIGS. 5 and 6, will be described the audio renderer 216 in detail.

Figure 5:
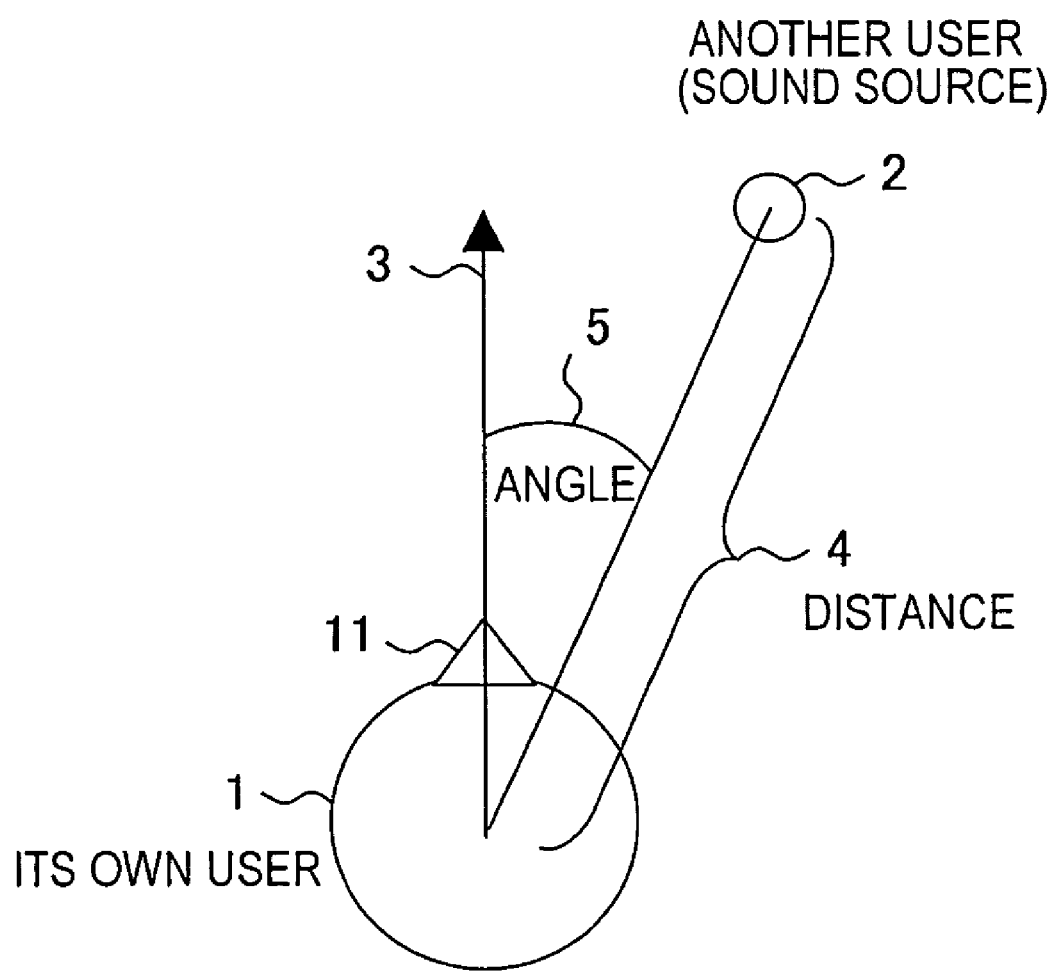
FIG. 5 is a diagram schematically showing a direction and distance of a sound source in the embodiment.

FIG. 5 is a diagram schematically showing a direction and distance of a sound source, i.e. a communication partner (another user). In FIG. 5 illustrates a head 1 showing a person seen from just above and a sound source 2 as a communication partner. The head 1 has a nose 11 which indicates a direction of the face. In other words, the head 1 faces in the direction 3 of the added nose 11. In the three-dimensional audio technique, a direction and distance of sound are expressed by HRIR (Head Related Impulse Response), which shows how sound changes around the head 1 (impulse response), and pseudo reverberation generated by a virtual environment such as a room. And, HRIR is determined by a distance 4 between the sound source 2 and the head 1 and angles (a horizontal angle and a vertical angle) 5 between the head 1 and the sound source 2. Here, it is assumed that the memory 302 or the external storage 303 previously stores numbers of HRIR measured for each distance and for each angle, using a dummy head (head 1). Further, as the numbers of HRIR, different numbers are used for a left channel (numbers measured at a left ear of the dummy head) and for a right channel (numbers measured at a right ear of the dummy head), to express senses of direction of right and left, front and back, and up and down.

Figure 6:
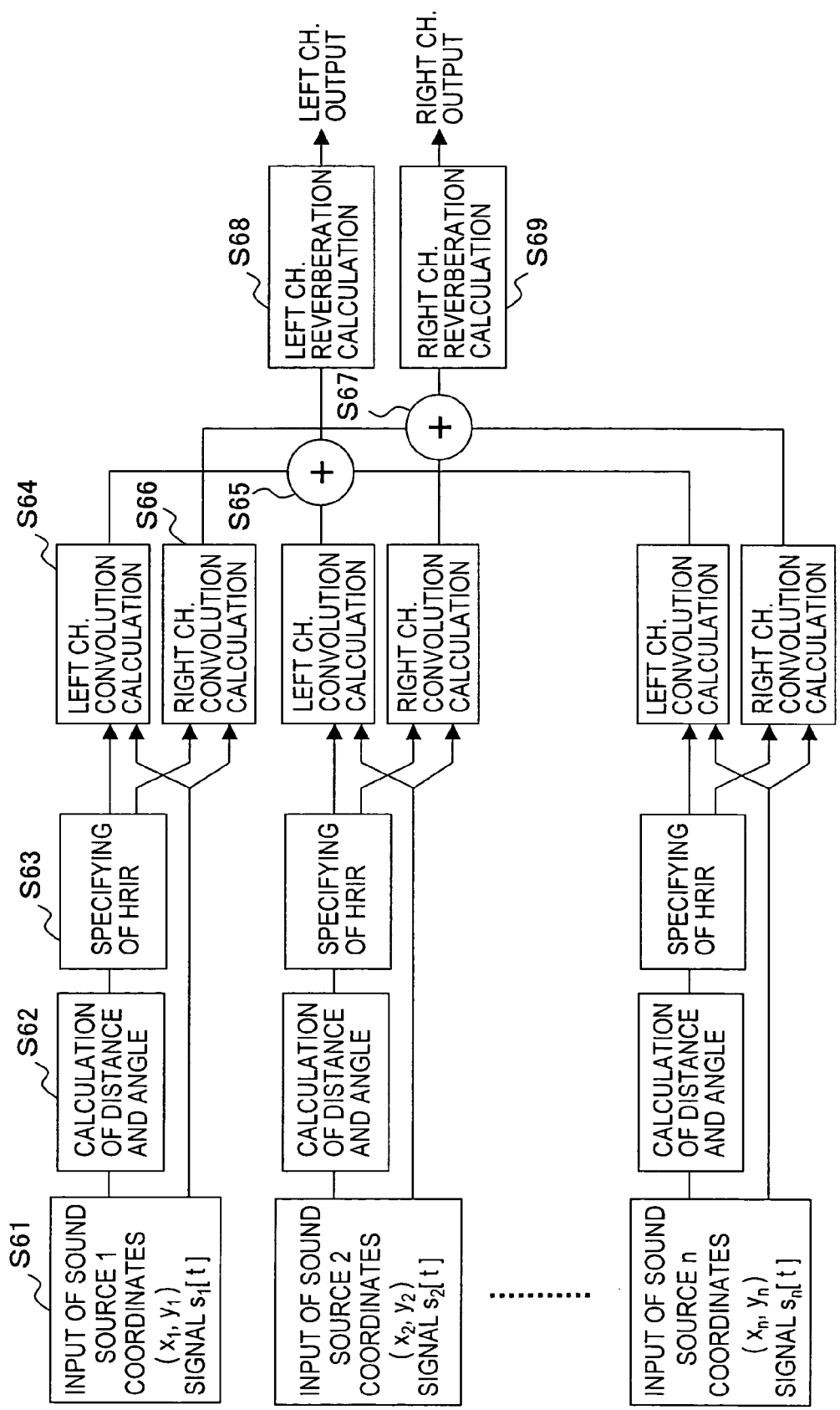
FIG. 6 is a diagram schematically showing processing in an audio renderer in the embodiment.

FIG. 6 is a diagram showing processing in the audio renderer 216. The audio renderer 216 performs the following calculation for each packet received (usually at intervals of 20 ms) using RTP (Real-time Transport Protocol) for each sound source (each user other than the user of the client 201 itself). As shown in the figure, for each sound source, the audio renderer 216 receives input of a signal string $s_i[t]$ (t=1, . . . ) and coordinates ($x_i$, $y_i$) of that sound source in the virtual space (S61). Here, coordinates of each sound source in the virtual space are inputted from the space modeler 221. After the space modeler 221 maps (locates) each sound source (each user other than the user of the client 201 itself) onto the virtual space, the space modeler 221 inputs the coordinates (positional information in the virtual space) of each user to the audio renderer 216. Further, a signal string of each sound source is inputted from the audio communication unit 215.

Then, for each sound source, the audio renderer 216 uses the inputted coordinates to calculate the distance and angle (azimuth) between the user of the client 201 itself and that sound source (S62). Here, it is assumed that the user of the client 201 itself is at the center (coordinates (0, 0)) of the virtual space. Then, the audio renderer 216 specifies HRIR corresponding to the distance and the angle (asimuth) between the user of the client 201 itself and each sound source out of HRIR values stored in advance in the memory 302 or the external storage 303 (S63). Here, the audio renderer 216 may use HRIR values calculated by interpolation of the HRIR values stored in the memory 302 or the like.

Then, the audio renderer 216 performs convolution calculation using the signal string inputted in S61 and the left channel HRIR of the HRIR specified in S63, to generate a left channel signal (S65). Then, the audio renderer 216 adds the respective left channel signals acquired from all the sound sources (S65). Further, the audio renderer 216 performs convolution calculation using the signal string inputted in S61 and the right channel HRIR of the HRIR specified in S63, to generate a right channel signal (S66). Then, the audio renderer 216 adds the respective right channel signals acquired from all the sound sources (S67).

Next, the audio renderer 216 adds reverberation to the left channel signal obtained from the addition (S68). Namely, the audio renderer 216 calculates the reverberation based on how sound changes (impulse response) according to the properties of the virtual space. As methods of calculation of reverberation, may be mentioned a calculation method called FIR (Finite Impulse Response) and IIR (Infinite Impulse Response). These methods are fundamental methods relating to a digital filter, and description of them is omitted here. Further, similarly to the left channel, the audio renderer 216 adds reverberation to the right channel signal obtained from the above-mentioned addition (S69). Although the specification of HRIR (S63) and the calculations of reverberation (S68 and S69) are performed for each packet as described above, the convolution calculations (S64 and S66) each generate a part to be carried forward to the next packet. As a result, it is necessary to hold a specified HRIR or a signal string inputted until processing of the next packet.

Thus, by performing processing such as volume control, superposition of reverberation and reflection, filtering and the like on user's (i.e., communication partner's) voice outputted from the audio communication unit 215, the audio renderer 216 controls sound effects to obtain sound to be heard at the location of the user of the client 201 itself in the virtual space. In other words, by performing processing resulting from the properties of the virtual space and a relative location with respect to a communication partner, voice is oriented and reproduced. As a result, a direction of a communication partner whose voice can not be heard directly can be easily grasped through the bodily senses.

Here, it is possible that the audio renderer 216 performs the processing resulting from the properties of the virtual space, such as reverberation and filtering, on its own user's voice outputted from the audio encoder 212, if necessary, and thereafter performs rendering of the voice at the position of the head of the user of the client 201. Its own user's voice generated by the audio renderer 216 is outputted to the headphones 217 to be heard by the user himself. When the user of the client 201 itself hears direct sound of his voice, sometimes the user receives a strange impression, and, in particular, a large delay disturbs the user in his vocalization. Thus, usually, the user of the client 201 itself is prevented from hearing his own voice. However, it is possible that the user of the client 201 itself is prevented from hearing the direct sound and made to hear only reverberation of delay within the limit of 10 ms. Thus, it is possible to make the user of the client 201 itself have bodily sensations relating to the location of the user himself in the virtual space and the size of the virtual sp ace.

As for image, the camera 213 shoots the head of the user, and the shot images are successively sent to the video encoder 214. Then, the video encoder 214 converts the images into a digital signal and outputs the signal to the graphics renderer 219. Further, the video communication unit 218 sends and receives a video signal (or signals) in real time to and from one or a plurality of other clients, and outputs the video signal (or signals) to the graphics renderer 219. Next, the graphics renderer 219 receives digital output signals from the video encoder 214 and the video communication unit 218.

Then, the graphics renderer 219 calculates (coordinate transformation) how communication partners are seen in the virtual space, based on the visual properties of the virtual space and the locations of the communication partners and the user himself in the virtual space. Those properties and the locations are held by the space modeler 221. Next, with respect to the communication partners' images outputted from the video communication unit 218, the graphics renderer 219 performs processing resulting from the properties of the virtual space, from the viewpoint of the location of the user himself, based on the above-mentioned calculation, to generate image data to be outputted onto a display screen. The image generated by the graphics renderer 219 is outputted to the display 220 and reproduced into an image seen from the viewpoint of the user of the client 201. The user refers to output of the display 220 at need.

Figure 7:
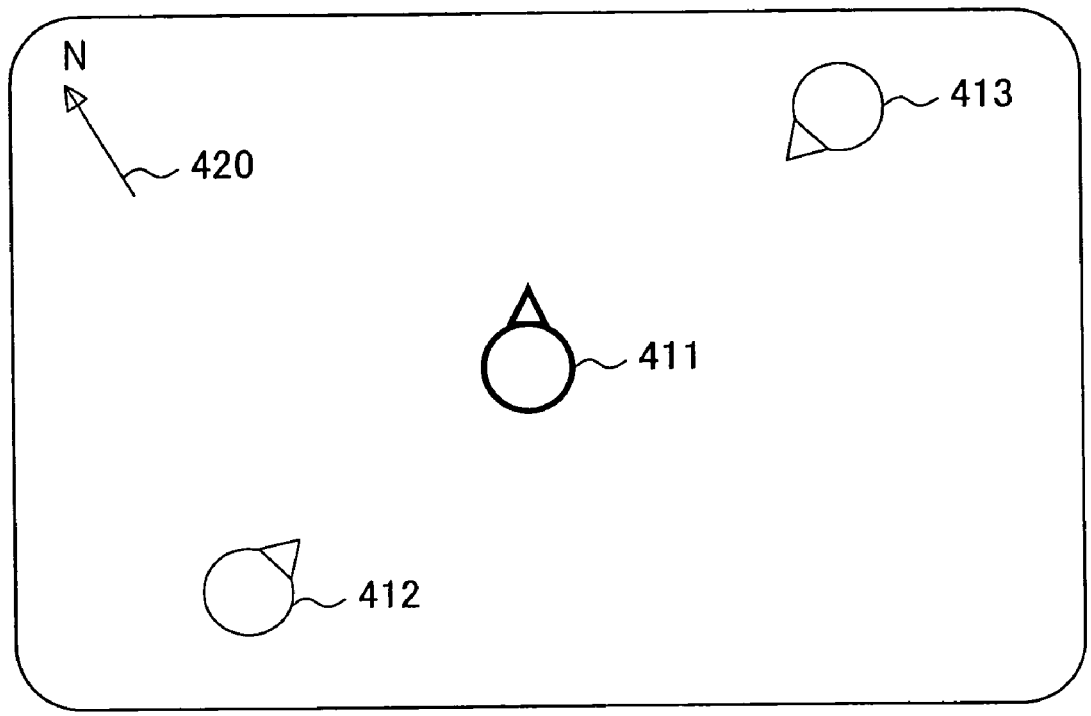
FIG. 7 shows an example of a display screen showing a virtual space in the embodiment.

FIG. 7 shows an example of the virtual space shown on the display 220. The content shown in FIG. 4 is an example where the user of the client 201 itself shares the virtual space with the first and second other users of the clients 202 and 203. In the example shown, the virtual space is illustrated in a plan view. Based on the properties of the virtual space, the location of the user of the client 201 itself in the virtual space and information on the other users, is displayed a two-dimensional image obtained by seeing, from just above, its own abutter 411 expressing the user of the client 201 itself and a first other abutter 412 and a second other abutter 413 expressing users as communication partners located in the virtual space. The mentioned properties, location and information are stored in the memory 302 or the external storage 303 by the space modeler 221. The graphics renderer 219 displays the image such that the location and direction of the user of the client 201 itself are fixed, and the virtual space and the other users in the virtual space move and turn relatively to the user of the client 201 as the center. When the user of the client 201 moves or turns in the real space, then, the space modeler 221 receives input from the GPS receiver 231 or the magnetic sensor 232 and performs mapping into the virtual space, so that a screen in which the virtual space or the other users in the virtual space move or turn relatively to the user of the client 201 itself is displayed in real time. Further, in the example shown, directional information 420 indicating the north is displayed.

Thus, it is possible to express positional relations between the user of the client 201 itself and the other users (the client 202 and 203) as communication partners in the virtual space. Further, by fixing the direction of the user of the client 201 itself in the forward direction, consistency between voice and graphics display is ensured, and locations and directions of the other users can be grasped as bodily sensations. Further, another user existing behind the user of the client 201 itself can be displayed, and thus favorably, a risk of overlooking another user approaching the user of the client 201 from the rear is small.

Although not shown in the figure, a scale may be shown on the display 220, and thus the distance to another user in the virtual space can be accurately expressed. For example, it is considered to use radio buttons or the like to select a scale out of a plurality of candidates, or to use a scroll bar slider to continuously change a scale. When the scale of the displayed plan view is changed immediately after operation of such buttons or a scroll bar slider, it is possible to see the state of distant things, to confirm the location of the user of the client 201 itself in a room (the virtual space), or to inspect the neighborhood in detail.

Further, although not shown, an image of its own user shot by the camera 213 of the client 201 is pasted on the abutter 411 by texture mapping, an image of the first other user shot by the camera 213 of the client 202 on the abutter 412, and an image of the second other user shot by the camera 213 of the client 203 on the abutter 413. When a user as a communication partner turns, also the texture is turned. Accordingly, it is possible to grasp directions toward which the first and second users face in the virtual space.

For real time voice or image communication, RTP (Real-time Transport Protocol) is used. RTP is a protocol described in the document RFC 3550 issued by IETF (Internet Engineering Task Force). When delay increase is allowable to some degree in voice or image communication, then, it is possible that a communication proxy server for voice or image communication is provided additionally and the audio communication unit 215 or the video communication unit 218 communicates voice or image with another client through the communication proxy server.

Hereinabove, the client 201 of FIG. 2 has been described. In the client 201, the microphone 211, the camera 213, the GPS receiver 231, the magnetic sensor 232, the headphones 217 and the display 220 are realized by hardware. On the other hand, the audio encoder 212 and the video encoder 214 are realized by software, hardware or their combination. Further, the audio communication unit 215, the video communication unit 218, the space modeler 221 and the session control unit 223 are ordinarily realized by software.

Next, referring to FIGS. 8A and 8B, examples of the clients 201, 202 and 203 will be described.

A client shown in FIG. 8A has a size and functions near to a PDA or a handheld computer. A client body 230 comprises a camera 213, a display 220, an operation unit 226, an antenna 237 and a GPS receiver 231. Further, a headset connected to the body 230 comprises headphones 217, a microphone 211 and a magnetic sensor 232. In the case where the magnetic sensor 232 is provided in the headphones 217 (for example, on an upper part of a head band), a user can put on the magnetic sensor 232 at an almost constant angle with the user. The operation unit 226 has instruction buttons 241-245 which inputs various instructions to the client 201. Among the instruction buttons 241-245, there is a reset button for adjusting a direction of the magnetic sensor 232 provided in the headphones 217 when a user puts on the headset. Although the headset shown in the figure is wired to the body 230, the headset may be connected through Bluetooth or IrDA (infrared) wirelessly. Further, the client is connected to the network 101 by means of the antenna 237 through a wireless LAN.

A client shown in FIG. 8B is an example of wearable computer. A client body 241 that looks like bows of a pair of spectacles is provided with a microphone 211, a camera 213, headphones 217, a display 220, a GPS receiver 231 and a magnetic sensor 232. The display 220 is a head mounted display, and forms a virtual image several ten centimeters ahead of a user who wears the client body 241, or forms a three-dimensional image ahead of the user. Further, the client of FIG. 8B has an operation unit 226 (not shown) connected by wire or wirelessly.

Next, referring to FIGS. 9-12, will be described procedures in the client 201.

FIG. 9 shows a procedure which connects the client 201 to the network 101. The connecting procedure shown in the figure is executed at the time of turning on power. First, the session control unit 223 sends a login message including identification information and authentication information of the user to the SIP proxy server 120 (S901). Receiving the login message, the SIP proxy server 120 sends an authentication request message for the user to the registration server 130. Then, the registration server 130 authenticates the user's identification information and authentication information, and sends the user's identification information to the presence server 110. For communication between the client and the registration server 130, it is considered to use a REGISTER message of the protocol SIP (Session Initiation Protocol) prescribed in the document RFC 3261 of IETF. The client sends a REGISTER message to the registration server 130 through the SIP proxy server 120, periodically.

Further, as for communication between the presence provider 222 of the client 201 and the presence server 110, it is possible to use a SUBSCRIBE message of SIP prescribed in the document RFC 3265 of IETF. SUBSCRIBE message is an even request message that previously requests reception of a notification at the time of event occurrence. The presence provider 222 requests the presence server 110 to notify an event that has occurred with respect to a room list and an attendance list. In the case where the presence provider 222 uses a SUBSCRIBE message, the presence provider 222 communicates with the presence server 110 through the session control unit 223 and the SIP proxy server 120.

Next, the presence provider 222 receives the room list from the presence server 110 (S902). Here, in the case where a SUBSCRIBE message was used in S901, then, the room list is received in the form of a NOTIFY message as the above-mentioned event notification message. Then, the presence provider 222 shows the received room list on the display 220 (S903).

FIG. 10 shows a procedure of the client 201 at the time when the user selects a room that he wishes to enter out of the room list shown on the display 220. The presence provider 222 of the client 201 receives a room selection instruction inputted through the operation unit 226 (S1001). Then, the presence provider 222 sends an entrance message (enter) to the presence server 110 (S1002). The entrance message includes the identification information of the user of the client 201 itself and the positional information and the directional information of the user in the real space. The positional information and the directional information of the user of the client 201 are calculated by the GPS receiver 321 and the magnetic sensor 322, and inputted to the space modeler 221. Then, the space modeler 221 stores the inputted positional information and directional information into the memory 302 or the external storage 303. The presence provider 222 reads the positional information and the directional information stored in the memory 302 or the external storage 303, and sends the entrance message including the positional information and the directional information.

Or, a SUBSCRIBE message of SIP may be used for sending an entrance message. Namely, a SUBSCRIBE message whose recipient is the selected room is used as an entrance message. A SUBSCRIBE message requests notification of events (for example, entrance, exit and movement of a user, and changes in the properties of the virtual space) occurred in the virtual space of the selected room.

Next, the presence provider 222 receives an attendance list listing users (other than the user of the client 201 itself) who are now in the selected room from the presence server 110 (S1003). When a SUBSCRIBE message is used as the entrance message, the attendance list in the form of a NOTIFY message corresponding to the SUBSCRIBE message is sent to the presence provider 222. It is assumed that the attendance list includes at least user identification information of the users in the room other than the user of the client 201 itself, their positional information and directional information in the real space, and the virtual space properties of the designated room. The virtual space properties includes the radius r of the sphere s as the virtual space shown in FIG. 4 or the radius r multiplied by a constant (hereinafter, referred to as a virtual space radius or the like).

Although a procedure which exits a room is not shown, the presence provider 222 receives an exit instruction from the user and sends an exit message including the user identification information to the presence server 110.

FIG. 11 shows a procedure in the case where the user changes his presence, i.e., moves in a room in the virtual space. First, the space modeler 221 receives input of positional information and directional information (hereinafter, referred to as positional information and the like) from the GPS receiver 231 and the magnetic sensor 232 (S1101). Then, the space modeler 221 compares the positional information and the like stored in the memory 302 or the external storage 303 (hereinafter, referred to as the memory or the like) with the positional information and the like received in S1101, to judge whether both are different (S1102). Here, the memory or the like stores the positional information and the like that was inputted from the GPS receiver 231 and the magnetic sensor 232 last time.

In the case where the received positional information and the like are same as the positional information and the like stored in the memory or the like, i.e., the user of the client 201 itself neither moves nor changes his direction in the real space (NO in S1102), the space modeler 221 returns to S1101 without performing the following processing.

In the case where the received positional information and the like are different from the positional information and the like stored in the memory or the like, i.e., the user of the client 201 itself moves or changes his direction in the real space (YES in S1102), the space modeler 221 stores the received positional information and the like into the memory or the like. Then, using the positional information and the like after the movement, the space modeler 221 changes the mapping or the direction of the user in the virtual space (S1103). The mapping into the virtual space is the non-linear mapping (described in FIG. 4) between the real space and the virtual space. The space modeler 221 locates the user of the client 201 itself at the center of the virtual space, and locates again the locations of the users existing in the same virtual space other than the user of the client 201 by the non-linear mapping.

Next, the space modeler 221 notifies the audio renderer 216, the graphics renderer 219 and the presence provider 222 of the positional information and the like after the movement (S1104). As described referring to FIG. 6, the audio renderer 216 calculates how voices of the communication partners are heard at the location and direction of the user of the client 201 in the virtual space. Here, the mentioned location and direction have been mapped onto the virtual space based on the positional information and the like in the real space. Then, based on the calculation, the audio renderer 216 performs processing such as volume control, reverberation, filtering and the like on the voices of the other users (the communication partners) outputted from the audio communication unit 215, and controls sound effects to obtain sound to be heard by the user of the client 201 at his location in the virtual space and updates the three-dimensional sound. Further, the graphics renderer 219 changes the viewpoint based on the location and direction of the user of the client 201 in the virtual space. Here, the mentioned location and direction have been mapped onto the virtual space based on the positional information and the like in the real space. And, the graphics renderer 219 calculates how the communication partners are seen in the virtual space (See FIG. 7). Then, the graphics renderer 219 generates image data to output on the screen as a view seen from that location in that direction, and updates the display screen.

Next, the presence provider 222 notifies the presence server 110 of the positional information and the like in the real space after the movement (S1105). When the SIP protocol is used, a NOTIFY message is used. A NOTIFY message is usually sent as a result of receiving a SUBSCRIBE message. Thus, it is considered that, when the presence server 110 receives an entrance message from the client 201, the presence server 110 sends not only the attendance list but also a SUBSCRIBE message corresponding to the above-mentioned NOTIFY message. Receiving the positional information and the like in the real space, which have been notified from the presence provider 222, the presence server 110 updates the positional information and the like of the user in question in the attendance list.

Figure 12:
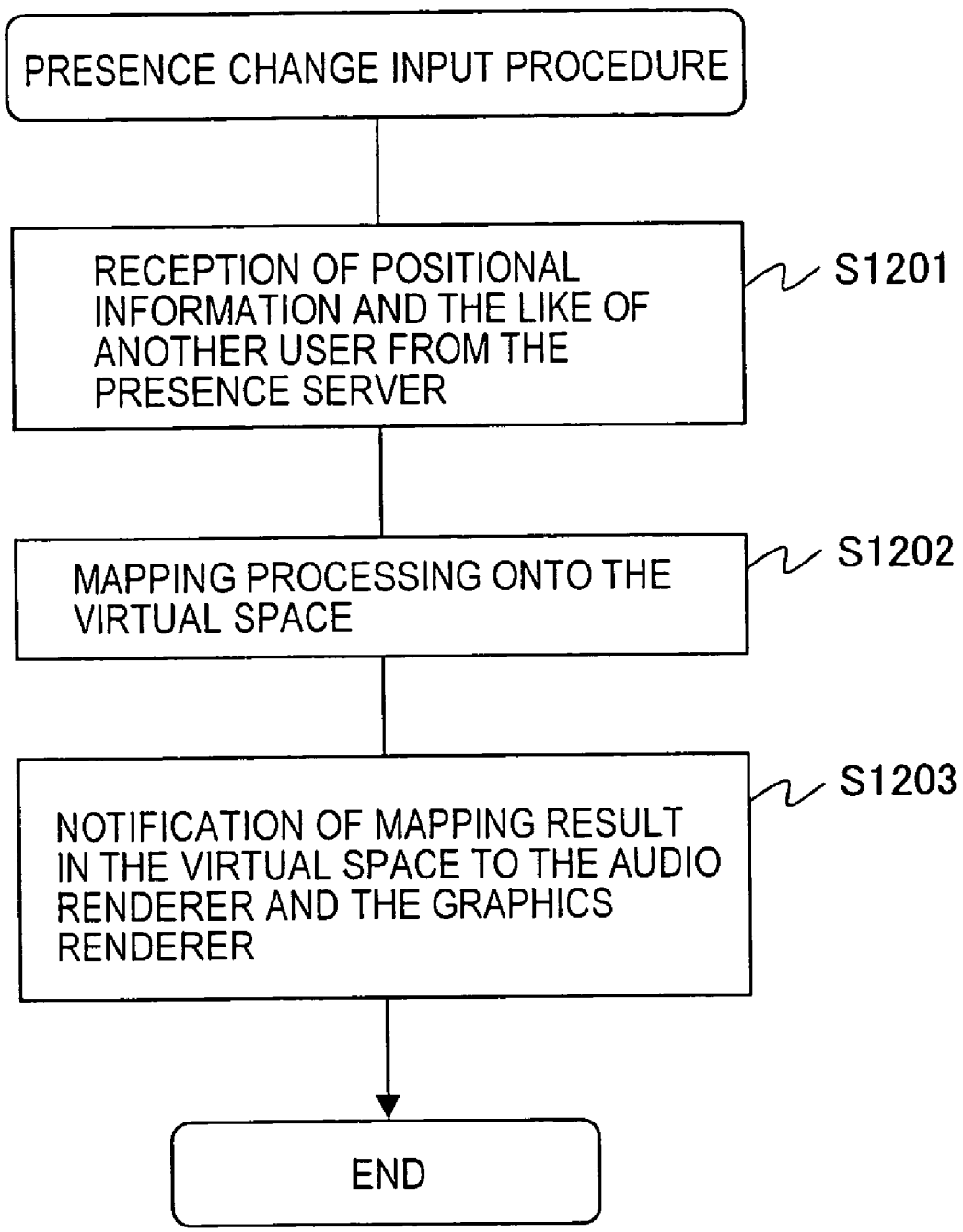
FIG. 12 is a flowchart showing processing of movement of another client's user by a client in the embodiment.

FIG. 12 shows a presence change input procedure, i.e., a procedure in the case where the presence server 110 notifies the client 201 of positional information and the like of another user in the real space.

The space modeler 221 receives the positional information and the like of a user of another client from the presence server 110 through the presence provider 222 (S1201). The presence server 110 notifies (sends) the positional information and the like sent from the client 201 in S1105 of FIG. 11 to the other clients than the client 201, i.e., the sender. Then, the space modeler 221 stores the notified positional information and the like into the memory or the like. Further, using the notified positional information and the like, the space modeler 221 maps the other users into the virtual space or change the directions of the other users (See FIG. 4). Then, the space modeler 221 notifies the audio renderer 216 and the graphics renderer 219 of the positional information and the like in the virtual space after movement (S1203). As described with respect to S1104 of FIG. 11, based on the notified location and direction of another user, the audio renderer 216 and the graphics renderer 219 update the three-dimensional sound of that user and the display screen.

Next, will be described a functional configuration and procedures of the presence server 110. The registration server 130 and the SIP proxy server 120 are similar to ones in the conventional communication using SIP, and their description is omitted here.

Figure 13:
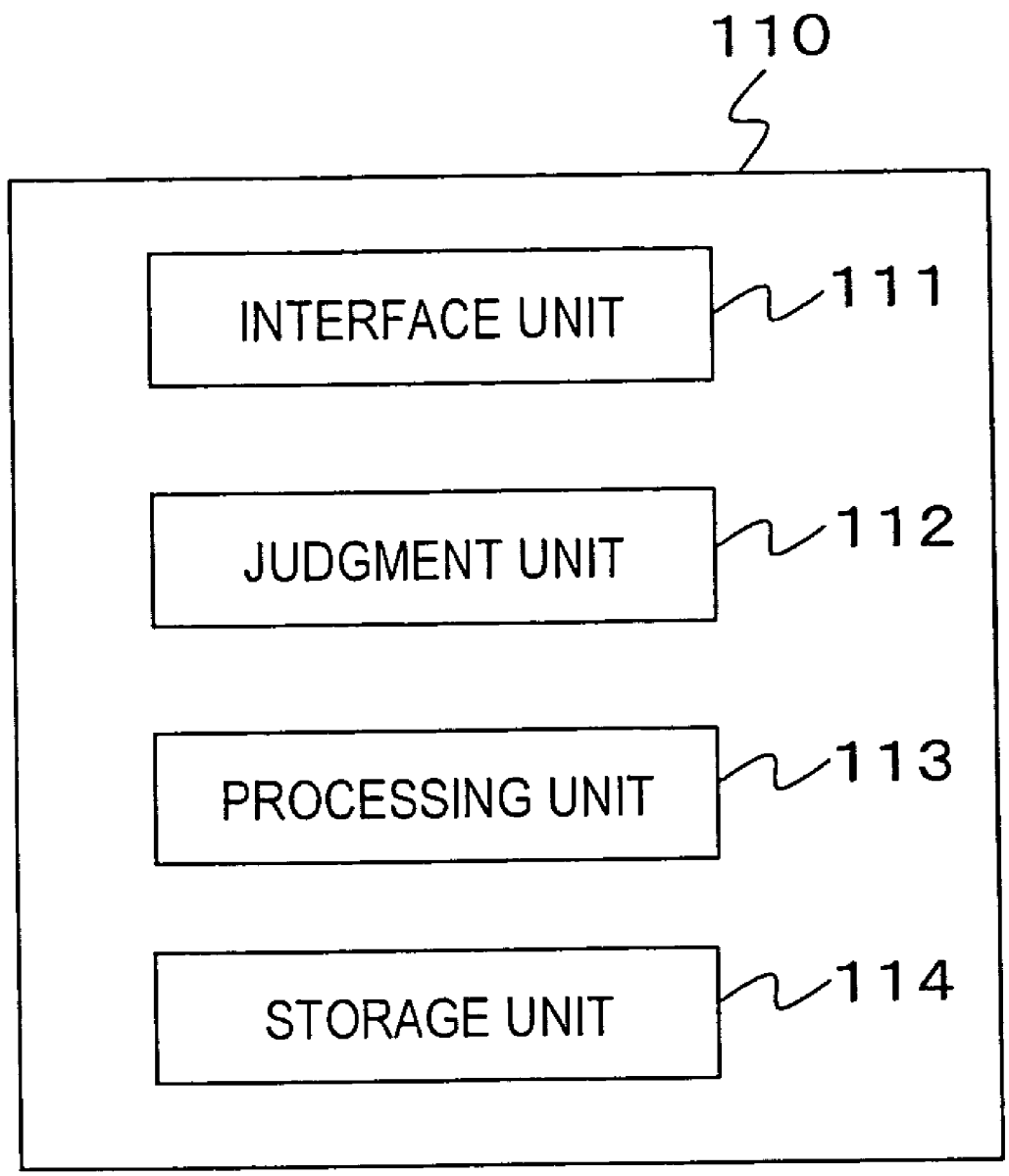
FIG. 13 is a functional block diagram showing a presence server in the embodiment.

FIG. 13 shows a functional configuration of the presence server 110. The presence server 110 comprises an interface unit 111 which sends and receives various pieces of information to and from a client, a judgment unit 112 which judges a kind of a message from a client, a processing unit 113 which performs processing corresponding to the judgment result, and a storage unit 114 which manages and stores properties of a virtual space, events (entrances, exits, movements, etc. of users) that have occurred in the virtual space, a room list, an attendance list, and the like. The storage unit 114 stores in advance properties of some virtual spaces managed by the presence server 110. As described above, a user selects a virtual space that he wants to enter out of those virtual spaces (See FIGS. 9 and 10). Thereafter, the client sends various events of the user who has entered the virtual space to the presence server 110. Thus, various events occur in each virtual space. The storage unit 114 stores the above information into the memory 302 or the external storage 303.

Figure 14:
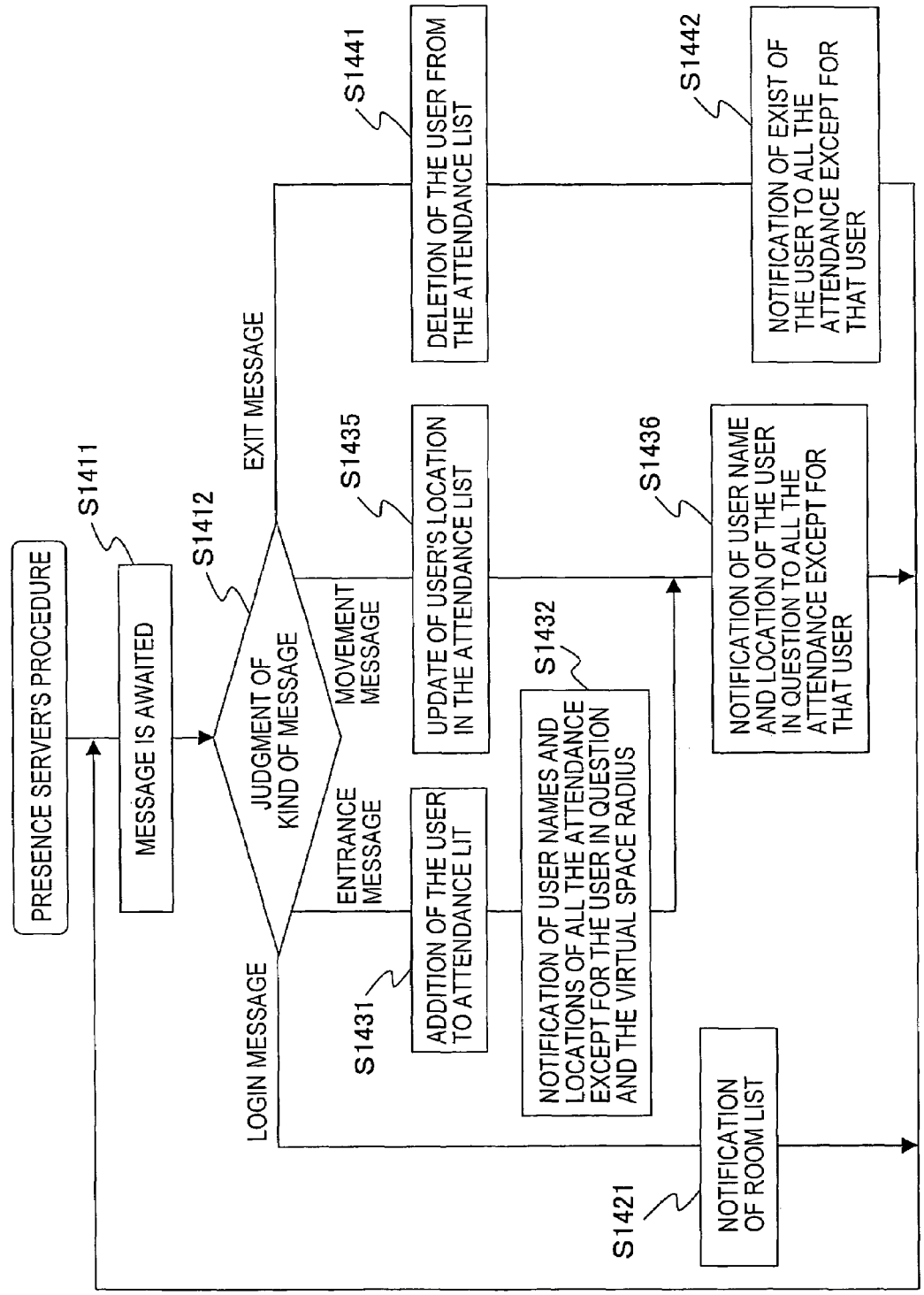
FIG. 14 is a flowchart showing a procedure of the presence server in the embodiment.

FIG. 14 shows a procedure of the presence server 110. The presence server 110 receives requests from clients and performs processing of the requests, until the presence server 110 is stopped. First, the interface unit 111 awaits a message from a client (S1411). When a message is received, then, the judgment unit 112 judges a kind of the message received by the interface unit 111 (S1412).

In the case where the message is a login message, the processing unit 113 instructs the interface unit 111 to send a room list to the client of the message source (S1421). The interface unit 111 sends the room list to the client of the message source. Thereafter, the procedure returns to S1411, to await a next message.

In the case where the massage is an entrance message, the processing unit 113 adds the user of the message source to the attendance list of the designated room (S1431). Namely, the processing unit 113 adds the identification information of the user in question and the positional information and the directional information of the user in the real space to the attendance list. Next, the processing unit 113 instructs the interface unit 111 to send the identification information and the positional information and the directional information of all the attendance (except for the user in question) of the designated room to the client as the message source. Further, the processing unit 113 instructs the interface unit 111 to send the virtual space properties of the designated room to the client as the message source. The virtual space properties include the radius r of the sphere s as the virtual space shown in FIG. 4 or the radius r multiplied by a constant (hereinafter, referred to as the virtual space radius or the like). According to the above instructions, the interface unit 111 sends those pieces of information to the client as the message source (S1432). Then, the procedure goes to S1436 described below.

In the case where the message is a movement message, the processing unit 113 updates the positional information and the directional information of (the user of) the client as the message source in the real space, in the attendance list (S1435). The positional information and the directional information are included in the movement message. Then, the processing unit 113 instructs the interface unit 111 to notify the identification information and the positional information and the directional information of the client as the message source to the clients of all the attendance of the room in question (except for the client as the message source) (S1436). According to the instruction, the interface unit 111 sends those pieces of information to the clients, and returns to S1411. This is same with the case of the entrance message (S1431).

In the case where the message is an exit message, the processing unit 113 deletes the user of the client as the message source from the attendance list (S1441). Then, the processing unit 113 instructs the interface unit 111 to notify the clients of all the attendance of the room in question (except for the client as the message source) of the exit of the user in question from the room (S1442). According to the instruction, the interface unit 111 sends the information to the clients, and returns to S1411.

Although not shown, the presence server 110 may receive a request (input) from an administrator of the presence server 110 to change the virtual space properties. For example, the judgment unit 112 receives an instruction inputted from the input unit 305 of the presence server 110 that the virtual space radius or the like should be changed. This instruction includes identification information which identifies a room as an object of the change and the virtual space radius or the like after the change. Then, the processing unit 113 changes the virtual space radius or the like stored in the storage unit 114 with respect to the room as the object of the change. Then, the processing unit 113 reads the attendance list stored in the storage unit 114 and notifies the changed virtual space radius or the like to the clients of all the users in the room as the object of the change. The space modeler of each client notified of the change maps each user in the real space onto the sphere s (shown in FIG. 4) having the changed virtual space radius or the like.

Hereinabove, the present embodiment has been described.

According to the present embodiment, a relative location and direction of a communication partner in the real space can be easily grasped through voice (media sound) of the communication partner as bodily sensations. Accordingly, users can have a natural conversation with one another in a virtual space and in the real space.

In the voice communication system of the present embodiment, each user is mapped onto a virtual space, based on a location and a direction of that user in the real space. As a result, even when a communication partner is at a distant place where his voice (direct sound) can not be heard in the real space, a relative location and direction of the communication partner can be easily grasped through voice (media sound) of the communication partner as bodily sensations. Thus, it is possible to easily find and approach the communication partner in a crowd.

Further, in the present embodiment, a direction in which a communication partner exists in the real space coincides with a direction in a virtual space. Accordingly, when a communication partner is at a point-blank distance from which his voice (direct sound) can be heard, it does not happen that the voice (direct sound) in the real space and voice (media sound) in the virtual sound are heard in different directions from each other. Thus, there does not occur an unfavorable situation that a person turns his face in a different direction when he responds to a hail from a communication partner.

The present invention is not limited to the above-described embodiment, and can be variously changed within the scope of the invention.

For example, the client 201 of the above embodiment is provided with the camera 213, the video encoder 214, and the like and outputs image data of the virtual space to the display 220. However, the voice communication system according to the present invention is a system using voice communication mainly. Thus, the client 201 does not need to output image data of the virtual space to the display 220. In that case, the client 201 does not have a camera 213, a video encoder 214, a display 220, and the like.

Further, in the present embodiment, the graphics renderer 219 uses a plan view (two-dimensional data) to express a virtual space (See FIG. 7). However, it is possible that the graphics renderer 219 uses a three-dimensional graphics technique to display a virtual space more clearly. In other words, based on three-dimensional data stored in the memory 302 or the external storage 303, such as the size of the space, properties (for example, materials of walls and a ceiling) of the virtual space, and locations and directions of the user of the client 201 and the other users in the virtual space, the space modeler 221 can generate a two-dimensional image to be shown on the display 220.

Further, the audio renderer 216 can perform the following processing on another user's (communication partner's) voice (media sound) outputted from the audio communication unit 215. For example, the audio renderer 216 may perform filtering on media sound so as to have impulse response that is impossible in the case of real voice (direct sound). Or, the audio renderer 216 may add reverberation that is different from reverberation of the real voice (direct sound) to another user's (communication partner's) voice (media sound) so that the sense of distance from the sound source can be recognized. Or, the audio renderer 216 may add noise to another user's (communication partner's) voice (media sound). In that case, even when a user as a communication partner is at a point-blank distance from which his real voice (direct sound) can be heard in the real space, it is easily judged whether communication partner's voice is real sound or media sound.

Further, in the case where a communication partner is at a distance from which his real voice (direct sound) can be heard in the real space, the communication partner's real voice (direct sound) and voice (media sound) outputted from the audio communication unit 215 are both heard. In that case, when a delay of the media sound is small, the media sound is used for orientation. On the other hand, when a delay of the media sound is too large, the media sound is heard, for example, like an independent sound source having no relation with the direct sound, thus causing confusion. Thus, in the case where a communication partner exists within a predetermined point-blank distance, the audio renderer 216 may control a delay time of communication partner's voice (media sound) to be within a certain range. When a delay of the media sound is larger than the direct sound and within a certain range, the media sound is heard as reverberation (echo) of the direct sound. In that case, the direct sound is used for orientation and occurrence of confusion can be prevented. Further, the audio renderer 216 may lower sound volume of voice (media sound) of a communication partner existing at a point-blank distance, by a certain amount or at a certain rate. In that case, the sound volume can balance with sound volume of a communication partner at a long distance from which only media sound can be heard.

A wireless communication technique Bluetooth may be used for judging whether a communication partner exists at a point-blank distance from which direct sound can be heard in the real space. Namely, when data can be sent and received using Bluetooth, then it is judged that the communication partner exists at a point-blank distance.

The client of the present embodiment uses the GPS receiver 231 and the magnetic sensor 232 to detect a location and direction of its user (client). However, a sensor network may be used for detecting a location and direction of a user (client). When a sensor network is used, user's location and direction can be detected even when the user uses the client indoors.

In the present embodiment, each client directly performs voice communication and makes three-dimensional voice from voice inputted from another client (See FIG. 6). However, in the case where processing and communication performance of a client is lower, such processing may be performed by a server. In other words, a sound server may be added newly to the network configuration shown in FIG. 1. In the following, will be described an embodiment having a sound server.

Figure 15:
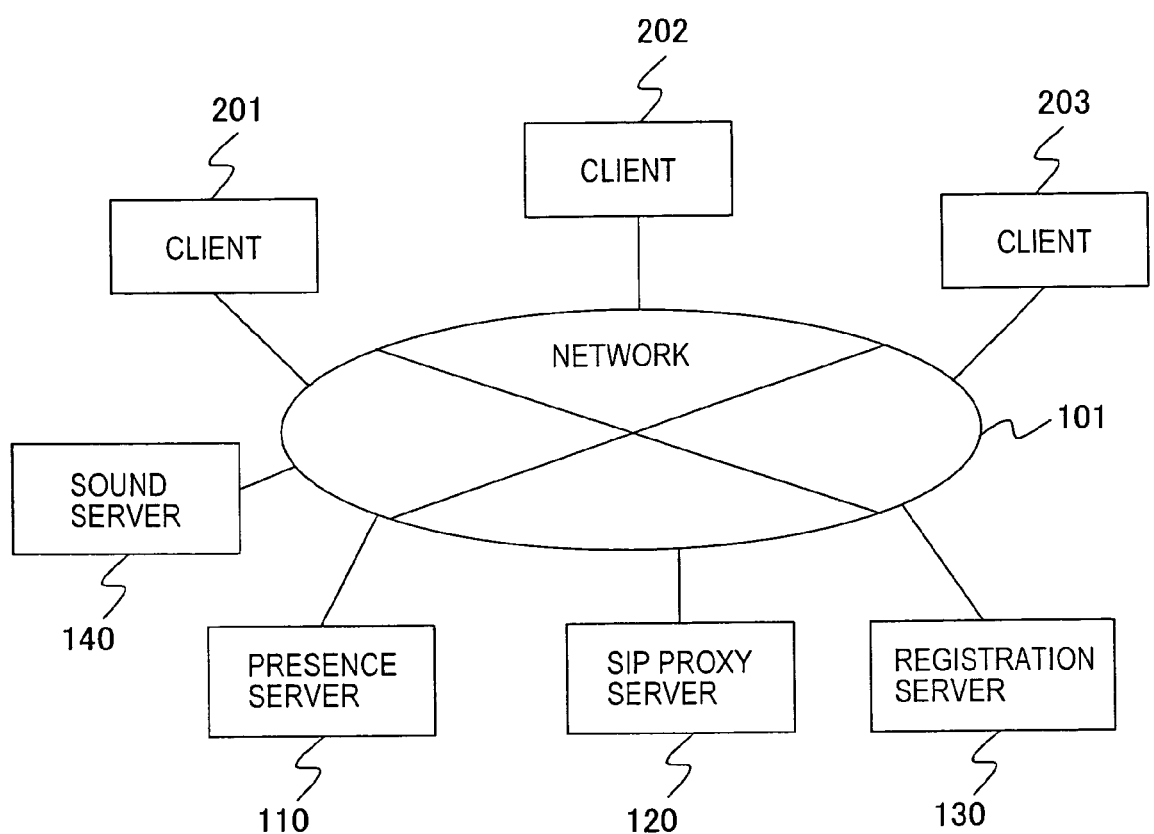
FIG. 15 is a diagram showing a network configuration of an embodiment having a sound server.

FIG. 15 is a diagram showing a network configuration of an embodiment having a sound server. The network configuration shown in the figure is different from the network configuration of FIG. 1 in that a sound server 140 exists in the network configuration of FIG. 15. Further, each of the clients 201, 202 and 203 has a different configuration from the client shown in FIG. 3 in the following points. Namely, the audio renderer 216 is simply a sound decoder that does not perform three-dimensional processing of sound (See FIG. 6). Further, the audio communication unit 215 communicates with the sound server 140, without directly communicating with another client.

Figure 16:
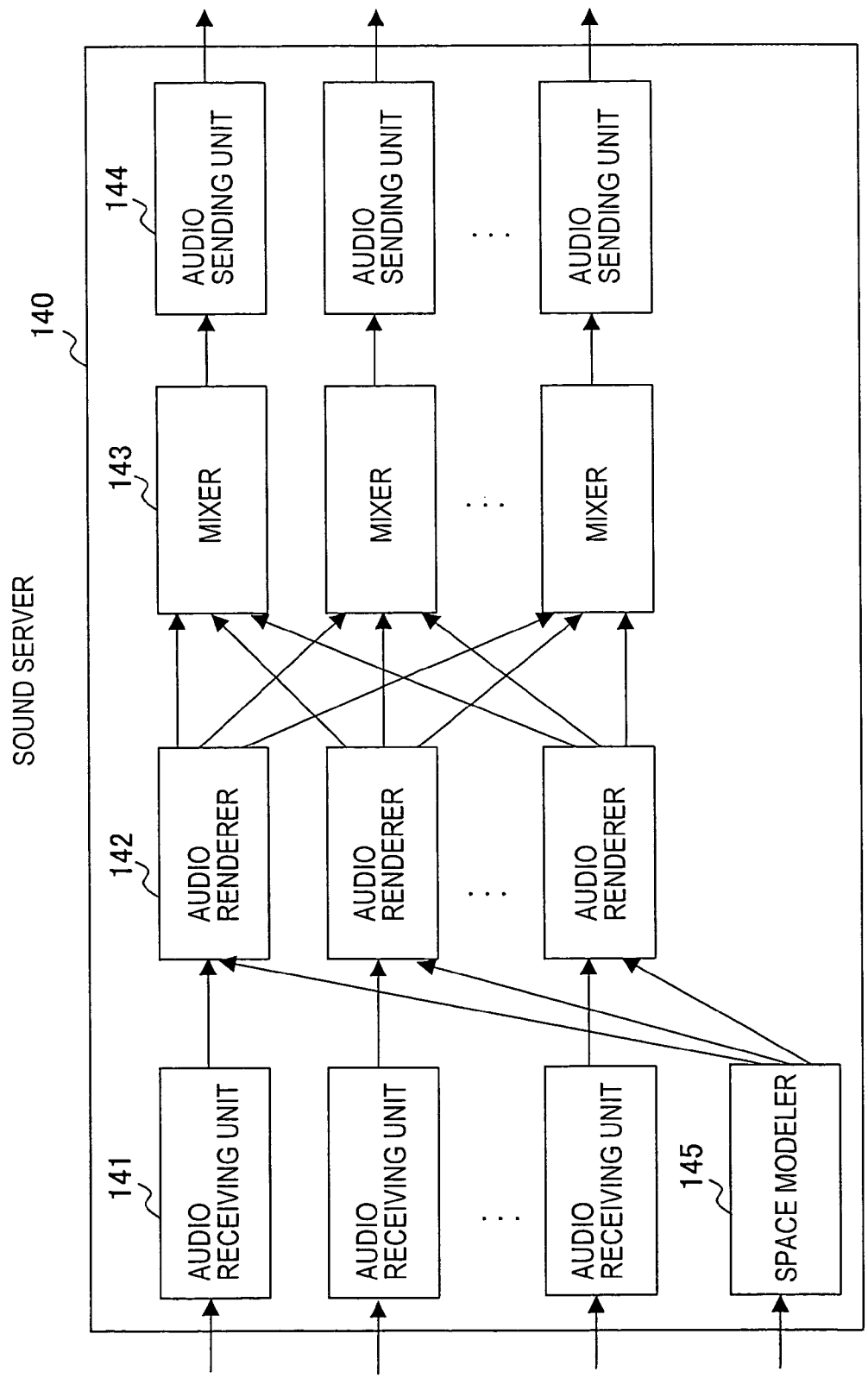
FIG. 16 is a functional block diagram showing the sound server in the embodiment having the sound server.

FIG. 16 is a block diagram showing the sound server 140. As shown in the figure, the sound server 140 comprises one or more audio receiving units 141, one or more audio renderers 142, one or more mixers 143, and one or more audio sending units 144. Namely, the sound server 140 has these processing units 141-144 correspondingly to the number of clients (i.e., one set of processing units 141-144 for each client). Or, without having the audio receiving units 141, the audio renderers 142, the mixers 134 and the audio sending units 144 correspondingly to the number of clients, but the sound server 140 may realize each of these functional units 141-144 for each client by using one program or one apparatus in a time sharing way.

Further, the sound server 140 further comprises a space modeler 145. The space modeler 145 receives a location of each user in the real space and properties of a virtual space (such as a virtual space radius or the like) from the presence server 110, and maps (locates) the location of each user onto the virtual space by processing similar to the processing of the space modeler 221 of the client 201 shown in FIG. 3.

Each audio receiving unit 141 receives voice inputted from the audio communication unit 215 of the client concerned. Each audio renderer 142 makes three-dimensional voice and outputs two-channel (left and right channels) signal data (a signal string) corresponding to the client concerned to the mixers 143 associated with respective clients. Namely, based on a location of each user in the virtual space arranged by the space modeler 145, each audio renderer 142 performs processing similar to the processing by the audio renderer 216 of the client shown in FIG. 3, i.e., reception of sound source input (S61 of FIG. 6), calculation of a distance and an angle (S62), specifying of HRIR (S63) and convolution calculation (S64 and S66). Each mixer 143 receives two-channel signal data from each audio renderer 142 and performs processing similar to the processing of the audio renderer 216 of the client shown in FIG. 3, i.e., mixing (S65 and S67) and reverberation calculation (S68 and S69). Then, each mixer 143 outputs two-channel signal data to the corresponding audio sending unit 144. Each audio sending unit 144 sends the received two-channel signal data to the corresponding client.

Next, will be described processing by the presence server 110 and the clients. When the presence server 110 notifies a user name (or names), a location (or locations) of a user (or users) concerned, and the virtual space radius or the like to the client (or clients) concerned, in the steps S1432, S1436 and S1442, the presence server 110 also notifies these pieces of information to the sound server 140. Thus, when each client enters a room, that client performs voice communication with a predetermined communication port of the sound server 140 (or with a communication port notified from the presence server 110 at the time of entrance). Namely, the audio communication unit 215 of each client sends a one-channel voice stream to the sound server 140, and receives a two-channel voice stream from the sound server 140.

Next, will be described processing by the sound server 140. Each audio receiving unit 141 associated with a client receives and buffers a voice stream from that client, to send signal data, which is synchronized (associated) with voice streams of all other input clients, to the audio renderer 142 associated with that client. A method of this buffering (Playout buffering) is described in the following document, for example.

Colin Perkins: RTP: Audio and Video for the Internet, Addison-Wesley Pub Co; 1st edition (Jun. 11, 2003)

Then, based on the location of each user in the virtual space arranged by the space modeler 145, each audio renderer 142 performs the processing of distance/angle calculation, specification of HRIR and convolution calculation (S62-S64 and S66 in FIG. 6). Then, each mixer 143 performs the mixing (S65 and S67 in FIG. 6) and the reverberation calculation (S68 and S69 in FIG. 6), and outputs two-channel signal data corresponding to the client concerned. Each audio sending unit 144 sends the two-channel signal data to the client concerned. Thus, even in the case where processing performance of clients is low, it is possible to realize three-dimensional voice.

Further, the presence server 110 may have the functions of the above-described sound server 140. In other words, without providing a sound server 140, the presence server 110 not only manages locations of the users, virtual space properties, and the like, but also performs the above-described processing of the sound server 140.

What is claimed is:

1. A voice communication system for realizing conversation between a plurality of users through a virtual space, wherein:
    said voice communication system comprises a server apparatus which manages respective locations of said plurality of users relative to a common coordinate system in a real space, and a plurality of client terminals used respectively by said plurality of users;
    each of said plurality of client terminals comprises:
    a location detection means which detects positional information relating to a location of a user of the client terminal itself relative to the common coordinate system in the real space;
    a client sending means which sends the positional information of the user of the client terminal itself in the real space to said server apparatus, with said positional information being detected by said location detection means;
    a client receiving means which receives positional information relating to a location of each of other users other than the user of the client terminal itself relative to the common coordinate system in the real space from said server apparatus;
    a space modeling means which calculates respective locations of said plurality of users in said virtual space, based on said positional information of the user of the client terminal with respect to the common coordinate system in the real world and said positional information of each of said other users with respect to the common coordinate system in the real space; and
    a sound control means which controls sound effects applied to a voice of each of said other users, based on the locations calculated by said space modeling means, wherein the sound effects are applied in a manner that the voice of each other user originates from a direction reflecting the respective location of each other user relative to the user of the client terminal in the real space; and
    said server apparatus comprises:
    a server receiving means which receives said positional information of a user of a client terminal with respective to the common coordinate system in the real space from said client terminal, for each of said plurality of client terminals;
    a storing means which stores said positional information of each of said plurality of users with respect to the common coordinate system in the real space, with said positional information being received by said server receiving means; and
    a server sending means which sends the positional information of other users than a user of a client terminal to said client terminal, for each client terminal of said plurality of client terminals, with said positional information being stored in said storing means.

2. A voice communication system according to claim 1, wherein:
    said location detection means of each client terminal further detects a direction in which the user of the client terminal itself faces with respective to the common coordinate system in the real space;
    said positional information includes directional information indicating the direction of the user of the client terminal itself or a direction of one of said other users with respective to the common coordinate system in the real space; and
    said sound control means controls the sound effects applied to the voice of each of said other users, based on said directional information of said user of the client terminal itself or said other users in the real space.

3. A voice communication system according to claim 2, wherein:
    said modeling means locates said user of the client terminal itself at a center of the virtual space, and calculates the location of each of said other users in the virtual space, based on a distance and direction between said user of the client terminal itself and the other user in question with respective to the common coordinate system in the real space, with said distance and direction being calculated based on the positional information of said user of the client itself and the positional information of said other user with respective to the common coordinate system in the real space.

4. A voice communication system according to claim 1, wherein:
    said sound control means controls the sound effects applied to the voice of each of said other users, based on the respective locations of said plurality of users in the virtual space and property information on properties of said virtual space.

5. A voice communication system according to claim 1, wherein:
    each of said plurality of client terminals further comprises an image generation means which generates image data to be outputted onto a display screen, based on the locations calculated by said space modeling means.

6. A voice communication system according to claim 5, wherein:
    said image generation means always fixes the location and direction of the user of the client itself in the virtual space, and generates image data obtained by moving or rotating said virtual space and said other users relatively to and centering around said user of the client itself.

7. A voice communication system according to claim 1, wherein:
    said storing means of said server apparatus stores properties of the virtual space;
    said server sending means sends said properties of the virtual space to each of said plurality of client terminals;
    said client receiving means receives said properties of the virtual space from said server apparatus;
    said space modeling means calculates the locations of each of said plurality of users in the virtual space, based on said properties of the virtual space;

said sound control means controls the sound effects applied to the voice of each of said other users, based on the locations calculated by said space modeling means.

8. A client terminal used by a user in a voice communication systems for realizing conversation between a plurality of users through a virtual space, comprising:
- a location detection means which detects positional information relating to a location of the user of the client terminal itself with respective to a common coordinate system in a real space;
- a sending means which sends the positional information of the user of the client terminal itself with respective to the common coordinate system in the real space to a server apparatus managing a location of each of said plurality of users in the real space, with said positional information being detected by said location detection means;
- a receiving means which receives positional information relating to a location of each of other users other than the user of the client terminal itself with respective to the common coordinate system in the real space from said server apparatus;
- a space modeling means which calculates locations of said plurality of users in said virtual space, based on said positional information of the user of the client terminal itself with respective to the common coordinate system in the real space and said positional information of each of said other users with respective to the common coordinate system in the real space; and
- a sound control means which controls sound effects applied to voice of each of said other users, based on the locations calculated by said space modeling means, wherein the sound effects are applied in a manner that the voice of each other user originates from a direction reflecting the respective location of each other user relative to the user of the client terminal in the real space.

9. A voice communication system for realizing conversation between a plurality of users through a virtual space, wherein:
- said voice communication system comprises a server apparatus which manages respective locations of said plurality of users with respective to a common coordinate system in a real space, a plurality of client terminals used respectively by said plurality of users, and a sound server apparatus which controls voices of said plurality of users;
- each of said plurality of client terminals comprises:
- a location detection means which detects positional information relating to a location of a user of the client terminal itself with respective to the common coordinate system in the real space;
- a client sending means which sends the positional information of the user of the client terminal itself with respective to the common coordinate system in the real space to said server apparatus, with said positional information being detected by said location detection means;
- a client receiving means which receives positional information relating to a location of each of other users other than the user of the client terminal itself with respective to the common coordinate system in the real space from said server apparatus;
- a client space modeling means which calculates locations of said plurality of users in said virtual space, based on said positional information of the user of the client terminal itself with respective to the common coordinate system in the real space and said positional information of each of said other users with respective to the common coordinate system in the real space;
- a client voice sending means which sends a voice of the user of the client itself; and
- a voice output means which receives respective voices of said other users, with sound effects of said voice being controlled based on said locations in the virtual space, and which outputs the voices of said other users, wherein the sound effects are applied in a manner that the voice of each other user originates from a direction reflecting the respective location of each other user relative to the user of the client terminal in the real space;
- said server apparatus comprises:
- a server receiving means which receives said positional information of a user of a client terminal with respective to a common coordinate system in the real space from said client terminal, for each of said plurality of client terminals;
- a storing means which stores said positional information of each of said plurality of users with respective to the common coordinate system in the real space, with said positional information being received by said server receiving means;
- a first server sending means which sends the positional information of other users than a user of a client terminal to said client terminal, for each client terminal of said plurality of client terminals, with said positional information being stored in said storing means; and
- a second server sending means which sends said positional information of each of said plurality of users of said plurality of client terminals to said sound server apparatus; and
- said sound server apparatus comprises:
- a server voice receiving means which receives the voice of a user of a client terminal from that client terminal, for each of said plurality of client terminals;
- a server space modeling means which receives the positional information of each of said plurality of users of said plurality of client terminals in the real space from said server apparatus, and which calculates respective locations of said plurality of users in said virtual space, based on said positional information of each of said plurality of users with respective to the common coordinate system in the real space;
- a sound control means which controls sound effects applied to the voice of each of said other users for each of said plurality of client terminals, based on the locations calculated by said server space modeling means, wherein the sound effects are applied in a manner that the voice of each other user originates from a direction reflecting the respective location of each other user relative to the user of the client terminal in the real space; and
- a server voice sending means which sends the voices of said plurality of users to each of said plurality of client terminals, with said voices being controlled by said sound control means.

10. A sound server apparatus in a voice communication system for realizing conversation through a virtual space between a plurality of users using a plurality of client terminals respectively, comprising:
- a voice receiving means which receives a voice of a user of a client terminal from that client terminal, for each of said plurality of client terminals;
- a space modeling means which receives positional information of each of said plurality of users of said plurality of client terminals with respective to a common coordinate system in the real space from an external system, and which calculates respective locations of said plurality of users in said virtual space, based on said positional information of each of said plurality of users with respective to the common coordinate system in the real space;

a sound control means which controls sound effects applied to the voice of each of said other users for each of said plurality of client terminals, based on the locations calculated by said space modeling means, wherein the sound effects are applied in a manner that the voice of each other user originates from a direction reflecting the respective location of each other user relative to the user of the client terminal in the real space; and a server voice sending means which sends the voices of said plurality of users to each of said plurality of client terminals, with said voices being controlled by said sound control means.

11. A voice communication method for realizing conversation between a plurality of users through a virtual space, wherein:

each of said plurality of client terminals used respectively by said plurality of users performs following steps:

a detection step which detects positional information relating to a location of a user of the client terminal in question with respective to a common coordinate system in the real space in the real space;

a sending step which sends the positional information of the user of the client terminal itself with respective to the common coordinate system in the real space to a server apparatus managing respective locations of said plurality of users with respective to the common coordinate system in the real space, with said positional information being detected in said detection step;

a receiving step which receives positional information relating to a location of each of other users than the user of the client terminal itself with respective to the common coordinate system in the real space from said server apparatus;

a calculation step which calculates respective locations of said plurality of users in said virtual space, based on said positional information of the user of the client terminal itself with respective to the common coordinate system in the real space and said positional information of each of said other users with respective to the common coordinate system in the real space; and a sound control step which controls sound effects applied to a voice of each of said other users, based on said locations calculated, wherein the sound effects are applied in a manner that the voice of each other user originates from a direction reflecting the respective location of each other user relative to the user of the client terminal in the real space.

12. A voice communication method according to claim 11, wherein:

said detection step further detects a direction in which said user of the client itself faces with respective to the common coordinate system in the real space; and said positional information includes directional information indicating the direction of the user of the client terminal itself or a direction of one of said other users.

13. A voice communication method according to claim 11, wherein;

each of said plurality of client terminals used respectively by said plurality of users further performs:

a generation step which generates image data to be outputted onto a display screen, based on the locations calculated in said calculation step.

14. A voice communication method according to claim 11, wherein: said sound control step controls the sound effects applied to the voice of each of said other users, based on the respective locations of said plurality of users in the virtual space and property information on properties of said virtual space.

* * * * *